United States Patent
Jeong et al.

(10) Patent No.: US 10,615,589 B2
(45) Date of Patent: Apr. 7, 2020

(54) DIGITAL LOP UTILIZING INTEGRATED MODULE AND MOTOR CONTROL CENTER SYSTEM INCLUDING SAME

(71) Applicant: ROOTECH INC., Suwon-si, Gyeonggi-do (KR)

(72) Inventors: Changyong Jeong, Suwon-si (KR); Boogi Moon, Hwaseong-si (KR); Junghun Yun, Suwon-si (KR); Yongju Kim, Yongin-si (KR)

(73) Assignee: ROOTECH INC., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/316,604

(22) PCT Filed: Jul. 4, 2017

(86) PCT No.: PCT/KR2017/007051
§ 371 (c)(1),
(2) Date: Jan. 9, 2019

(87) PCT Pub. No.: WO2018/012776
PCT Pub. Date: Jan. 18, 2018

(65) Prior Publication Data
US 2019/0305543 A1 Oct. 3, 2019

(30) Foreign Application Priority Data
Jul. 14, 2016 (KR) .................. 10-2016-0089262

(51) Int. Cl.
*H02B 1/24* (2006.01)
*H02J 13/00* (2006.01)
(Continued)

(52) U.S. Cl.
CPC ............ *H02H 7/0822* (2013.01); *H02B 1/24* (2013.01); *H02J 9/00* (2013.01); *H02J 9/066* (2013.01); *H02J 13/00* (2013.01)

(58) Field of Classification Search
USPC ........................................ 318/558
See application file for complete search history.

(56) References Cited

U.S. PATENT DOCUMENTS 5,352,857 A * 10/1994 Ovaska ............... B66B 1/18
187/247
8,670,859 B2 * 3/2014 Hrachovec ......... G05B 19/0426
318/568.1
(Continued)

FOREIGN PATENT DOCUMENTS

JP 2006-149118 A 6/2006
JP 2010-233322 A 10/2010
(Continued)

*Primary Examiner* — Bentsu Ro
(74) *Attorney, Agent, or Firm* — Rabin & Berdo, P.C.

(57) ABSTRACT

The present invention relates to a motor control center system comprising an integrated module which is connected to multiple protection control modules through a first serial communication network and is connected to multiple LOP controllers through a second serial communication network, and communicates with a computer or a PLC in a main control room, wherein i) operation command transmission between the LOP controllers and the protection control modules and ii) measured-data collection, operational-state reporting, or control command transmission between the main control room or the PLC and the protection control modules are performed while the integrated module commonly intervenes therebetween; and commonly use the first serial communication network.

19 Claims, 22 Drawing Sheets

(51) Int. Cl.
*H02H 7/08* (2006.01)
*H02J 9/06* (2006.01)
*H02J 9/00* (2006.01)

(56) References Cited

U.S. PATENT DOCUMENTS

| | | | | |
|---|---|---|---|---|
| 2008/0258667 A1* | 10/2008 | Morris | ............... | G01R 1/04 |
| | | | | 318/490 |
| 2010/0085677 A1* | 4/2010 | Rivers, Jr. | ........... | H02J 13/0017 |
| | | | | 361/172 |
| 2016/0380570 A1* | 12/2016 | Farr | ................ | H02P 1/04 |
| | | | | 318/504 |
| 2019/0064908 A1* | 2/2019 | Kim | ................ | G01R 31/343 |

FOREIGN PATENT DOCUMENTS

| | | |
|---|---|---|
| KR | 10-0632711 B1 | 10/2006 |
| KR | 10-2013-0049022 A | 5/2013 |
| KR | 10-2016-0008818 A | 1/2016 |

\* cited by examiner

| inlet unit | basic unit | basic unit | basic unit | basic unit |
| | | | basic unit | basic unit |
| | basic unit | basic unit | basic unit | basic unit |
| | | | basic unit | basic unit |
| | basic unit | basic unit | basic unit | basic unit |

FIG. 1

DIGITAL LOP UTILIZING INTEGRATED MODULE AND MOTOR CONTROL CENTER SYSTEM INCLUDING SAME

TECHNICAL FIELD

The present invention relates to a digital local operating panel (LOP) utilizing an integrated module and a motor control center system including the same. More specifically, the present invention relates to a technique for configuring a digital LOP and achieving communication redundancy and power redundancy with the LOP by utilizing an integrated module connected to multiple protection control modules through a serial communication network in a motor control center (MCC) and for efficiently and stably performing operation commands transmission between the LOP and the protection control module and measurement data collection, operation state reporting, or control command transmission between a main control room or a PLC and the protection control module by commonly utilizing the integrated module and the serial communication network.

BACKGROUND ART

The motor control center (MCC) includes a basic unit each constituted of a circuit breaker, a switchgear, a protection control module, etc. to control, stop, and protect the motor and an inlet unit constituted of a main line for supplying power to a branch line of each basic unit and a circuit breaker (See FIG. 1).

The protection control module, which is one of the components constituting the basic unit, may be configured separately as a protection device and a control device and is applied to various products ranging from a device of simple function to a device of high function with a communication function.

A digital protection control module having a communication function has been widely used, as it is necessary to be controlled in front of the MCC panel and controlled remotely from the main control room in the case of a factory or a building (refer to FIG. 2).

On the other hand, for the purpose of connection with the local operating panel (LOP) responsible for the operation of the motor at a local place where the motor is installed, analog signal lines are usually installed per a basic unit (see FIG. 3).

In order to check the current flowing through the motor in the LOP, the CT installed in the basic unit should be connected to the ammeter of the local operating panel. In order to display the operation status (RUN, STOP, etc.) of the motor on the local operating panel, digital output (DO) terminals of the protection control module in the basic unit are connected to the display lamps of the local operating panel. In order for operation command such as RUN, STOP, and the like obtained by pressing push buttons in the local operating panel to control the magnet contactor (M/C) of the protection control module through digital input (DI) terminals of the protection control module, the push buttons in the local operating panel have to be connected to the DI terminals of the protection control module.

However, since such analog signal lines have to be installed between each basic unit and the corresponding local operating panel, it is obvious that the installation cost is high and maintenance is difficult. In FIG. 3, although it is shown that only one basic unit is connected to the local operating panel for the sake of convenience, in reality, this connection is required between all the basic units and the local operating panel, whereby a large number of cables are required.

In order to solve the problem of connecting LOPs, which are typically several tens to several hundreds of meters away from the motor control board, using the analog signal lines, a method may be considered in which a device of the LOP is used with a digital device having a serial communication function and is connected to the protection control module of the basic unit via communication.

In addition, it is noted to think about a method in which upon connecting all the LOPs at once via serial communication, a serial communication device installed in the motor control center performs communications with the LOPs and distributes and assembles the communications to and from the protection control module of each basic unit.

However, in the above methods, a signal line and a communication line are required between the serial communication device of the motor control center and the protection control module of each basic unit. According to the present invention, a new type module called a 'integrated module' is installed in the motor control center, a serial communication network is installed between the integrated module and each protection control module, and in particular, this serial communication network is commonly used between the LOPs and each protection control module and between the LOPs and a computer or a PLC in a main control room, thereby increasing efficiency in the overall system configuration surrounding the motor control center.

However, as the digital equipment that performs serial communication is included in the LOP, unlike analog type LOP in the related art, the digital LOP needs power supply. Since the power supply is improperly out of the power supply system for operation of the motor control center when power supply in the vicinity of the local place is used, it is desirable to draw power supply from the motor control center.

Since the control power of the LOP cannot be obtained from the local place where the LOP is installed, it is needed to be connected to power supply in the motor control center. As shown in FIG. 4(a), the LOP may receive power using a single power line in parallel. However, when a power line is disconnected at one point, there is a problem that power cannot be supplied to the LOP that is at a stage subsequent to the point where the disconnection occurs.

In order to solve this problem, an individual power line may be connected to each LOP as shown in FIG. 4(b). In this case, however, a large number of power lines, which are proportional to the number of LOPs, has to be connected. There is a problem of losing the advantage in a method of connecting all LOPs via serial communication. Although the number of signal lines is reduced as compared with the analog signal line, the power line must be connected to each LOP, thereby having no almost advantage of efficiency.

While the present invention has been described with reference to exemplary embodiments, it is to be understood that the invention is not limited to the disclosed exemplary embodiments.

DISCLOSURE

Technical Problem

An object of the present invention is to provide a motor control center system with an increased efficiency when configuring a system surrounding a motor control center.

In addition, the present invention is also intended to provide a motor control center system that has efficiency and stability when supplying power to a digitized LOP.

In addition, the present invention also provides a motor control center system having both efficiency and fault tolerance in terms of communication or power supply when configuring a system surrounding a motor control board.

Technical Solution

A motor control center system according to one aspect of the present invention includes multiple protection control modules included for each of basic units constituted by an array in a motor control center to protect or control a motor; and multiple LOP controllers receiving at least operational command for the motor at a local place where the motor is installed, the system further including an integrated module connected to the multiple protection control modules through a first serial communication network and connected to the multiple LOP controllers through a second serial communication network to communicate with a computer or a PLC in a main control room.

i) Operation command transmission between the LOP controllers and the protection control modules and ii) measurement data collection, operational state reporting, or control command transmission between the main control room or the PLC and the protection control modules are performed while the integrated module commonly intervenes therebetween and commonly use the first serial communication network.

A motor control center system according to one aspect of the present invention includes multiple protection control modules included for each of basic units constituted by an array in a motor control center to protect or control a motor; and multiple LOP controllers receiving at least operational command for the motor at a local place where the motor is installed, the system further including an integrated module connected to the multiple protection control modules through a first serial communication network and connected to the multiple LOP controllers through a second serial communication network; and multiple power supply modules located in vicinity of the multiple LOP controllers and generating DC power from an input power supply, wherein the multiple power supply module applies the DC power in parallel to at least two different points for some wires in a communication cable constituting the second serial communication network.

The motor control center system may further include an LOP relay device relaying serial communication between the multiple LOP controllers and the integrated module, in which the multiple LOP controllers and the LOP relay device are connected to each other to form a ring.

In the motor control center system, the integrated module may include a master integrated module and a slave integrated module which constitutes a pair, and the LOP relay device includes a master LOP relay device and a slave LOP relay device which constitutes a pair, in which the master integrated module is connected to each of the master LOP relay device and the slave LOP relay device, and the slave integrated module is also connected to each of the master LOP relay device and the slave LOP relay device.

A motor control center system according to one aspect of the present invention includes multiple protection control modules included for each of basic units constituted by an array in a motor control center to protect or control a motor; and multiple LOP controllers receiving operational command for the motor at a local place where the motor is installed, the system further including a master integrated module and a slave integrated module connected to the multiple protection control modules through a first serial communication network and connected to the multiple LOP controllers through a second serial communication network; and a master LOP relay device and a slave LOP relay device relaying serial communication between the multiple LOP controllers and the master integrated module or the slave integrated module, wherein the master integrated module is connected to each of the master LOP relay device and the slave LOP relay device, and the slave integrated module is also connected to each of the master LOP relay device and the slave LOP relay device, and one of the master integrated module or the slave integrated module is selectively activated, and one of the master LOP relay device or the slave LOP relay device is selectively activated.

Advantageous Effects

According to one aspect of the present invention, since configurations needed for communication in various directions are commonly used when configuring the system surrounding the motor control center, it is possible to increase the efficiency, easily perform an integrated control of overall configurations of the motor control center, increase maintenance convenience, and enable redundancy and fault tolerance for the LOP power supply and redundancy and fault tolerance for the communication, which will be described later.

In addition, according to one aspect of the present invention, there are advantages that power may be normally supplied to all the LOP controllers even if some power supply modules fail or some power supply lines from the motor control center are disconnected, and power may be supplied to all the LOP controllers even if the communication cable for serial communication is disconnected or unplugged at one point.

In addition, when it is necessary to increase the capacity of the power supply module due to reduction in the power supply voltage caused by the length of the long power line or a large number of the LOP controllers, the number of the LOP controllers to which the power supply modules are installed may be increased, thereby easily coping with reduction of the power supply voltage and increase of the capacity.

According to one aspect of the present invention, since DC power is applied in parallel to at least two different points for some wires in a communication cable constituting a serial communication network, there are advantages that the number of power supply modules and power lines may be substantially reduced and a normal power supply is possible even if some power supply modules fail or some power supply lines are disconnected.

In addition, according to one aspect of the present invention, it is possible to cope with the failure of the integrated module or the LOP relay device, cope with the disconnection occurring in any communication line and communication port, cope with the abnormality of the power supply line or the power supply module from the motor control center, thereby substantially improving fault tolerance of the system. In addition, the power supply module and the power supply line may installed in only some LOPs or LOP relay devices, without a need of installing the power supply module and the power supply line on all the LOPs, which results in more efficient configuration.

In addition, according to one aspect of the present invention, by configuring the 'integrated module', which controls the motor control center and controls the three-directional communication with the LOP, the protection control module, and the main control room (PLC), it is possible to configure a system with high stability even upon communicating with the LOPs and supplying power.

DESCRIPTION OF DRAWINGS

FIG. 1 is a layout diagram showing a configuration of a general motor control center at a front surface.

BEST MODE

Figure 2:
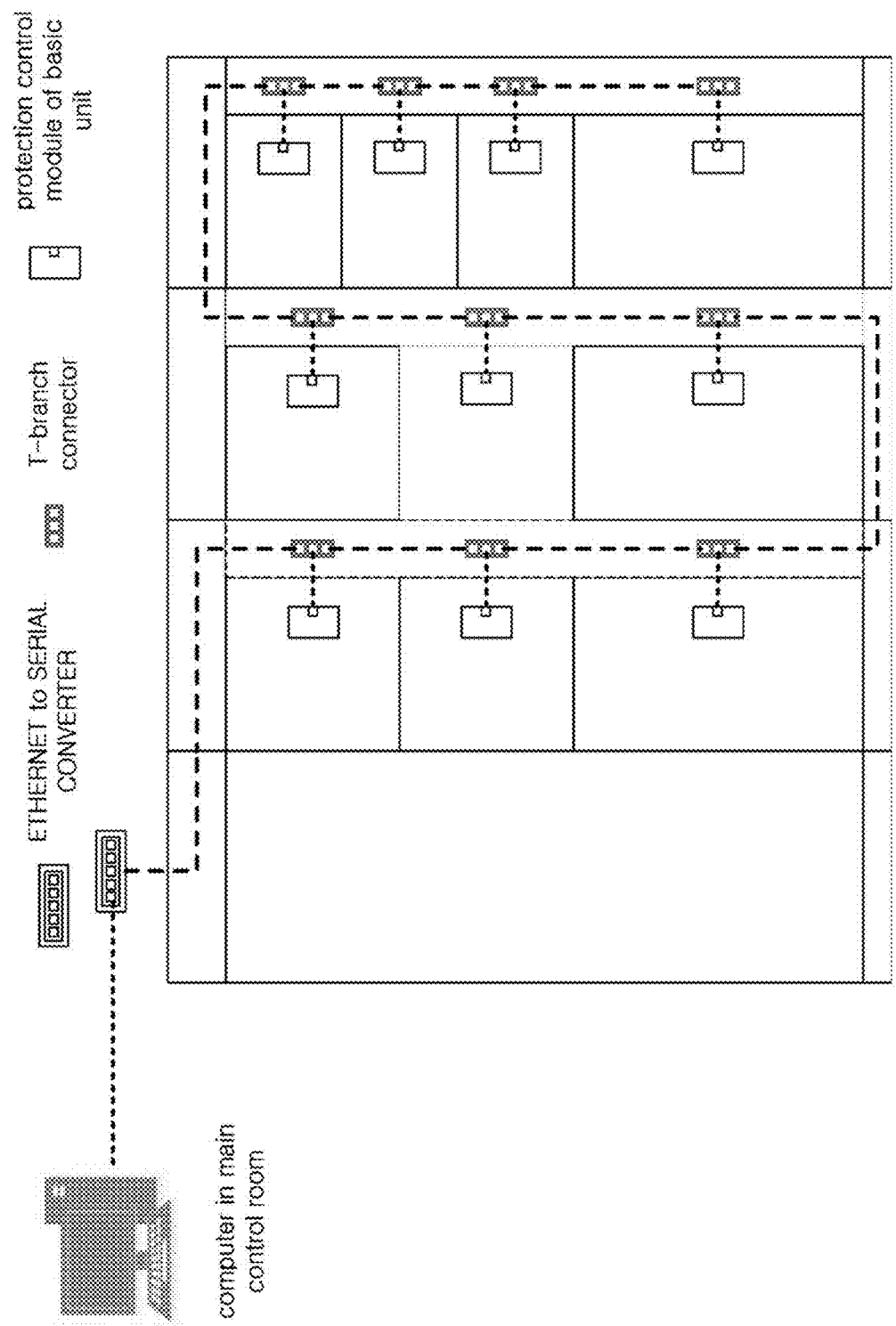
FIG. 2 is a view showing a state in which a protection control module of each basic unit and a computer of a main control room are connected via communication in a motor control center in the related art.
Figure 3:
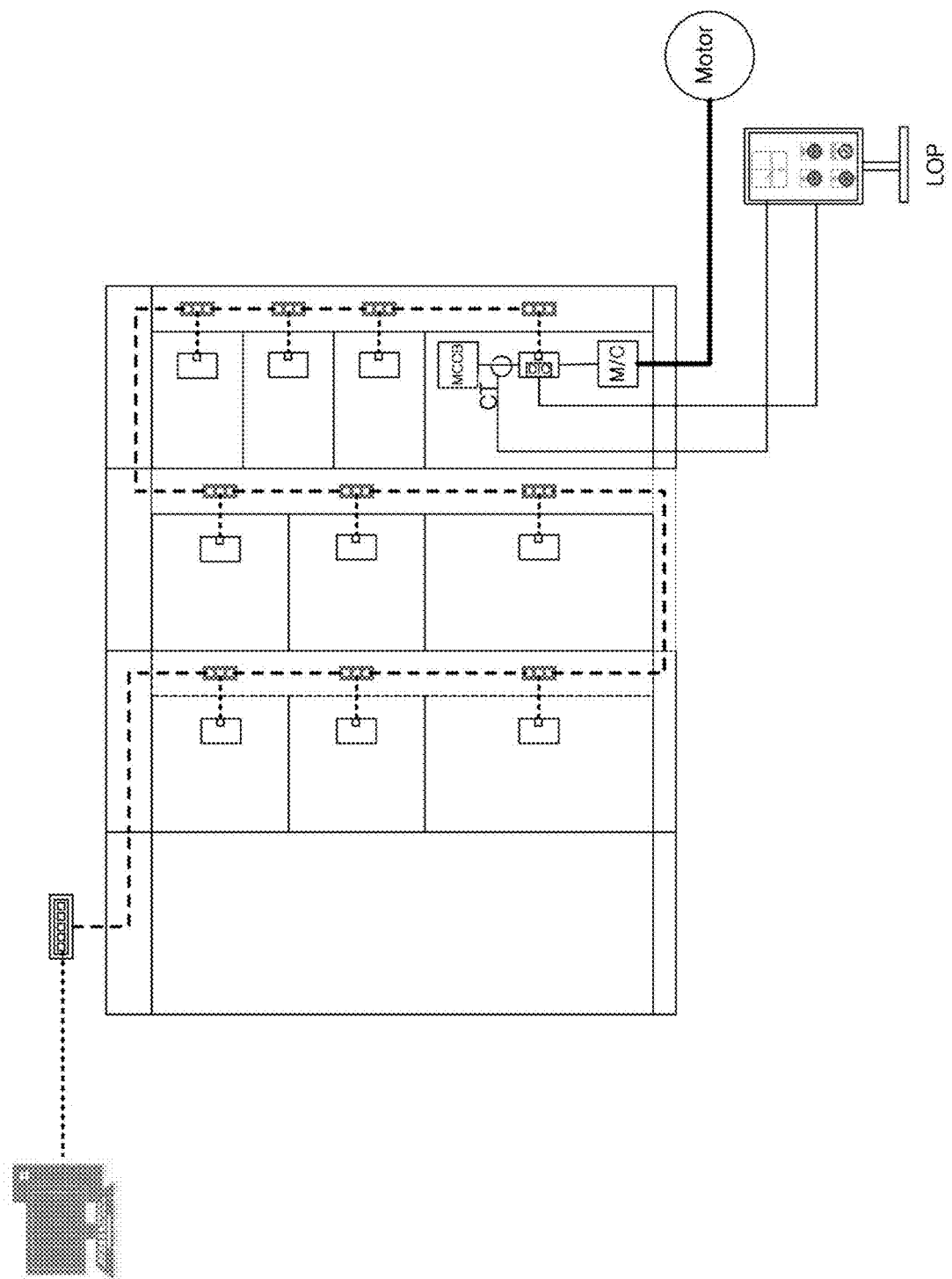
FIG. 3 is an exemplary view showing a connection between a basic unit and an LOP of a motor control center in the related art.

The above and other features and advantages of the present invention will become more apparent by describing in detail exemplary embodiments thereof with reference to the attached drawings. The present invention may, however, be embodied in many different forms and should not be construed as limited to the embodiments set forth herein. In order to clearly illustrate the present invention, parts not related to the description are omitted, and similar names and reference numerals are used for similar parts throughout the specification. Particularly, the matters described in the preceding embodiments can be omitted from the description of the subsequent embodiments.

Figure 5:
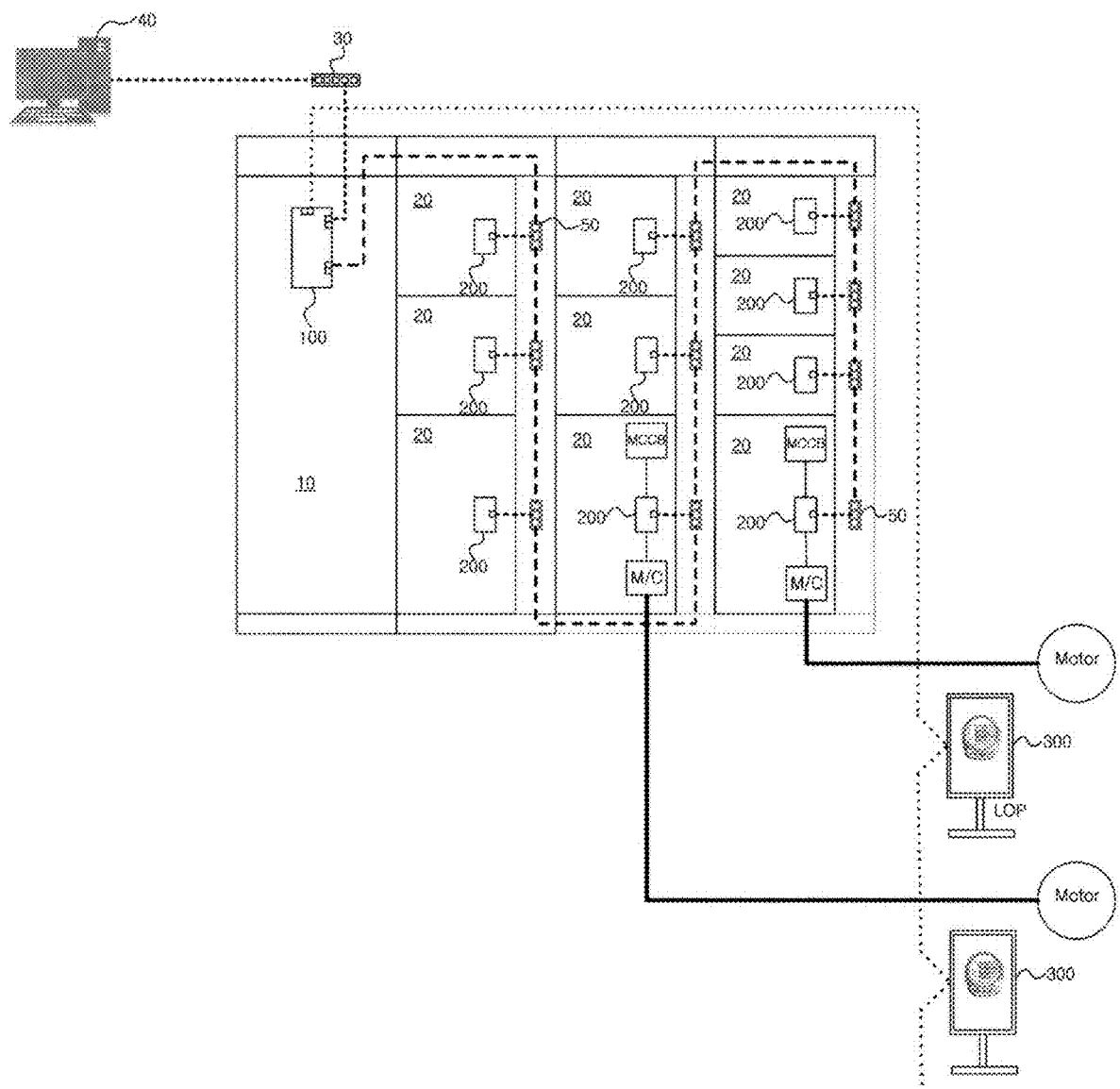
FIG. 5 is a diagram showing the overall configuration of a motor control center system according to an embodiment of the present invention.
Figure 6:
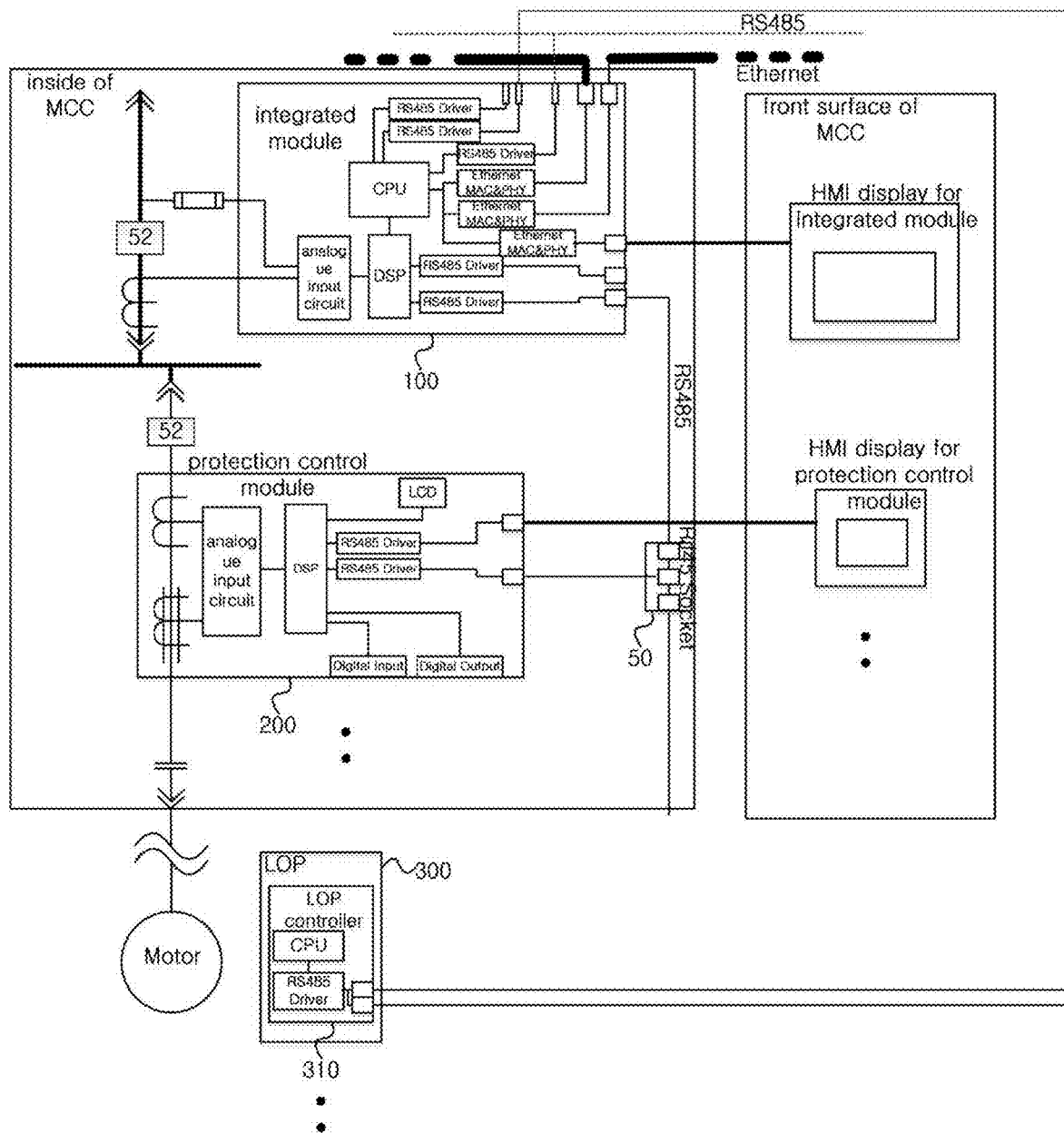
FIG. 6 is a diagram illustrating an internal configuration of an integrated module, a protection control module, and an LOP in a motor control center system according to an embodiment of the present invention.

FIG. 5 is a diagram showing the overall configuration of a motor control center system according to an embodiment of the present invention, and FIG. 6 is a diagram illustrating an internal configuration of an integrated module, a protection control module, and an LOP in a motor control center system according to an embodiment of the present invention.

The motor control center system generally includes a protection control module and an LOP. The protection control module 200 according to an embodiment of the present invention is also included in each basic unit 20 configured by an array in the motor control center to perform functions of protecting or controlling the motor, and the LOP controller 310 configured in the LOP 300 performs a function of receiving an operation command for the motor at a local place where the motor is installed.

The integrated module 100, the protection control module 200 and the LOP controller 310 include a serial communication driver such as an RS-485 driver and a communication module for Ethernet communication such as an Ethernet MAC & PHY, and an analog input circuit and a DSP for performing signal input and signal processing for the sensed voltage signal and/or a current signal, and a CPU for controlling all functions of the integrated module 100, the protection control module 200, or the LOP controller 310 and performing necessary calculations, respectively.

However, in the motor control center system according to the embodiment of the present invention, an 'integrated module' 100 is provided, as a new device of performing communication with the protection control module 200 of the basic unit 20 in the motor control center while simultaneously performing communication with the LOP controller 310. The best position where the integrated module 100 is installed is in an inlet unit 10 of the motor control center, so that the integrated module 100 is provided in the inlet unit 10 including a main line that supplies power to the branch line of the basic unit 20 and a main circuit breaker.

The integrated module 100 performs three communication functions, such as communication with a computer or a PLC in a main control room (Ethernet communication or RS-485 serial communication, etc.), internal communication with the protection control modules 200 of the basic unit 20, and communication with the LOP controllers 310 and controls all aspects of the motor connected to the motor control center.

The integrated module 100 has a serial communication port such as RS-485 and an Ethernet communication port and is capable of communicating with the computer or the PLC in the main control room in various ways. In addition, the integrated module 100 receives the voltage and current of the inlet main line through PT, CT, analog input circuit, and DSP, and analyzes a variety of measured values and power quality to provide the resulting to the computer of the main control room. This function is possible only when a separate power meter is installed in the case of the motor control center in the related art.

Figure 22:
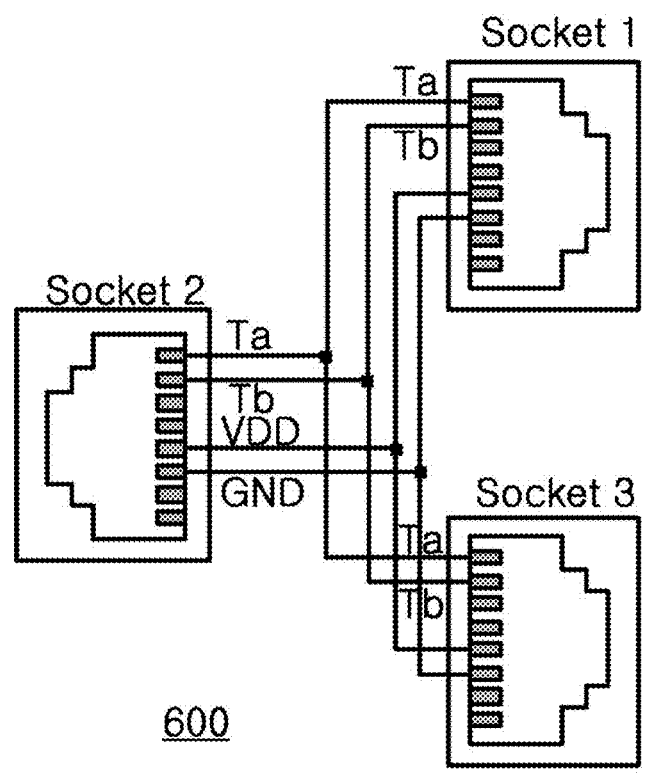
FIG. 22 is a diagram showing an internal configuration of a socket board.

The integrated module collects measured data and motor operation state of the motor unit 20 through serial communication such as the RS-485 with the protection control modules 200 of the basic unit 20, performs a function of transmitting control command from the main control room, and transmits the voltage data sampled by the input unit 10 using the PT and the analog input circuit to the protection control module 200 of each of the basic units 20. The integrated module 100 provides the voltage data sampled in the main line to multiple protection control modules 200 in the motor control center, to acquire information about the power by calculating the voltage data with current data that the protection control module 200 acquires, for example. This method provides a way for the individual basic unit 20 to measure power without contacting the branch line to acquire a voltage signal. A HMI display is provided to support the inlet unit 10 and the basic unit 20 on the front surface of the motor control center. When the socket board 50 includes three sockets to which the corresponding pins are connected in common, the socket board is configured as shown in FIG. 22.

The integrated module 100 of the inlet unit 10 and the LOP controller 310 are serially connected via a single line to minimize installation time and cost. Since the integrated module 100 is connected to both the protection control module 200 of the basic unit 20 and the LOP controller 310, the operation state of the motor collected by the protection control module 200 is transmitted to the LOP controller 310 to be watched at the local place, and the LOP controller 310 receives an operation command related to the motor operation via an operation on a button or the like installed on the front thereof and transmits the operation command to the protection control module 200 to perform control functions such as start and stop of the motor.

The integrated module 100 forms a first serial communication network with the protection control modules 200 and functions as a master of serial communication in a serial communication network, in which each protection control module 200 functions as a slave. The integrated module 100 forms a second serial communication network with the LOP controllers 310 and functions as a master of serial communication in the second serial communication network, in which each LOP controller 310 functions as a slave.

Figure 7:
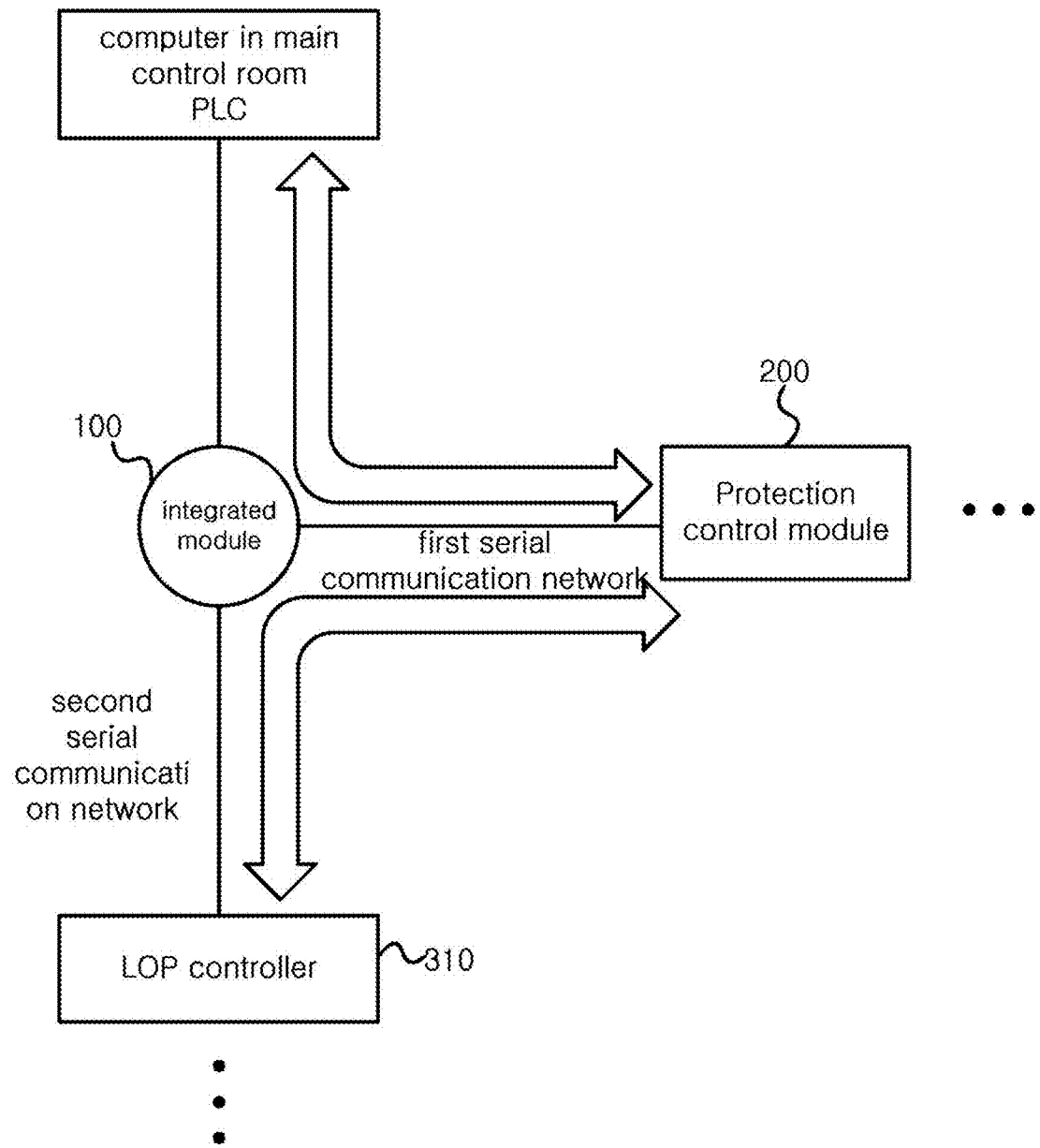
FIG. 7 is a diagram illustrating communication between a computer of a main control room, an integrated module, a protection control module, and an LOP in a motor control center system according to an embodiment of the present invention.

As shown in FIG. 7, the integrated module 100 is connected to multiple protection control modules 200 in each basic unit through the first serial communication network and is connected to the LOP controllers 310 of the LOP 300 through the second serial communication network, and communicates with a computer or a PLC in the main control room. One feature of the present invention is that i) operation command transmission between the LOP controllers 310 and the protection control modules 200 and ii) measurement data collection, operational state reporting, or control command transmission between the computer or PLC of the main control room and the protection control modules 200 are performed while the integrated module 100 commonly intervenes therebetween and commonly use the first serial communication network.

According to this feature of the present invention, since configurations needed for communication in various directions are commonly used when configuring the system surrounding the motor control center, it is possible to increase the efficiency, easily perform an integrated control of overall configurations of the motor control center, increase maintenance convenience, and enable redundancy and fault tolerance for the LOP power supply and redundancy and fault tolerance for the communication, which will be described later.

According to an aspect of the present invention, the integrated module 100 of the inlet unit 10 and the LOP controllers 310 at the local place are connected to each other via communication, thereby improving the wiring efficiency and maintenance convenience. However, there is a need for an efficient way to supply power to the LOP controller 310, and there is a disadvantage that communication may not performed in some areas in the event of occurrence of disconnection in the communication line, due to the characteristics of the serial communication network, whereby it is necessary to take countermeasures against these problems.

Figure 8:
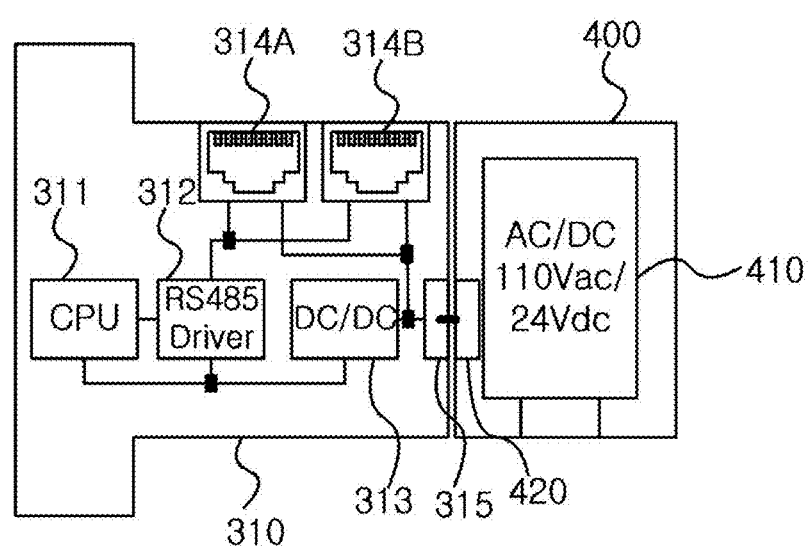
FIG. 8 is a diagram illustrating a combination of a LOP controller 310 and a power supply module 400 according to an embodiment of the present invention.
Figure 9:
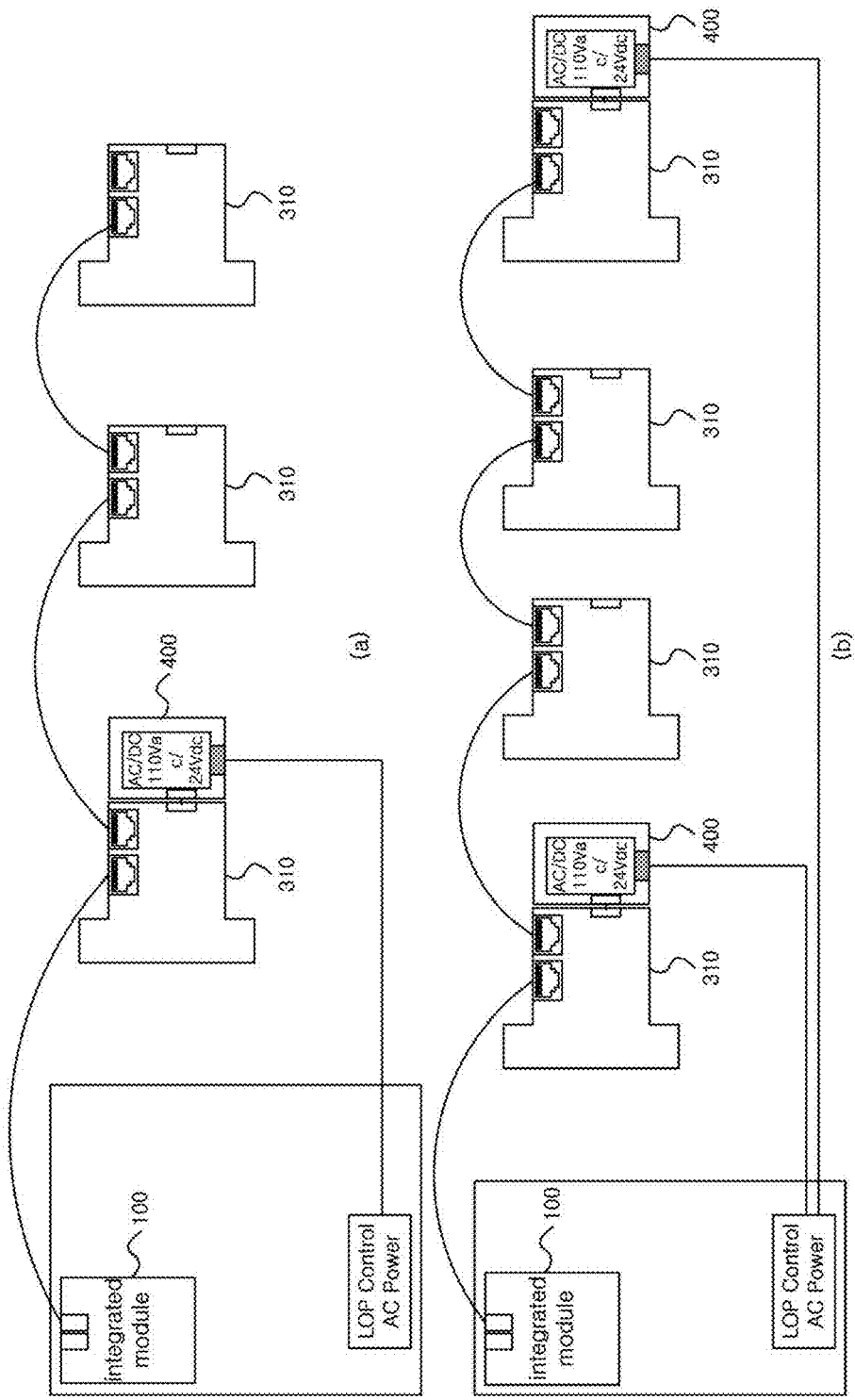
FIG. 9 is a diagram showing an example of supplying power to each LOP controller 310 according to an embodiment of the present invention.

FIG. 8 is a diagram illustrating a combination of a LOP controller 310 and a power supply module 400 according to an embodiment of the present invention, and FIG. 9 is a diagram showing an example of supplying power to each LOP controller 310 according to an embodiment of the present invention.

The LOP controller 310 is configured to include a CPU 311 for overall control, a driver 312 for serial communication such as RS-485, a DC/DC converter 313 for converting and outputting the input DC voltage, and two sockets 314A and 314B such as an RJ45 socket to/from which a plug of a communication cable is attached/detached. The power supply module 400 includes a power conversion unit 410 that converts the input AC or DC power to DC power of a DC voltage required by the LOP controller 300 to generate the DC power. The power supply module 400 is detachable or attachable to the outside of the LOP controller 310 and includes connectors 315 and 420 for securing a power supply path therebetween.

For example, the input rating of the LOP controller 310 is DC 24V, and the power supply of DC 24V input from the outside is converted into an appropriate voltage used in the controller through the DC/DC converter 313 and then provided to internal circuits such as CPU 311 and the like. In addition, DC power such as DC 24V is output to some terminals of the two sockets 314A and 314B without passing through the DC/DC converter 313 and is loaded on some wires (lines) of a communication cable for serial communication.

The sockets 314A and 314B serve as communication ports for serial communication. Two sockets 314A and 314B are provided in each LOP controller 300 to easily realize connection between the integrated module 100 of the motor control center and the LOP controller 300 at the local place.

In an embodiment of the present invention, a power supply module 400, which is detachably mounted on the back surface of the LOP controller 310, is developed and applied to simplify the wiring of the AC power cable. The input of the power supply module 400 is an AC or DC voltage connected from the motor control center (for example, it may be AC 110V, which is mainly used in Korea) and converts the input voltage to DC voltage such as DC 24V to be supplied to the LOP controller 310.

In the LOP controller 310, for example, direct current of DC 24V supplied from the power supply module 400 is supplied to the DC/DC converter 313 and the sockets 314A and 314B. The direct current is used as an internal power supply of the LOP controller 310 via the DC/DC converter 313 and is supplied to other neighboring LOP controllers 310 through a communication cable used for communication. In the LOP controller 310 receiving the DC power through the communication cables and the sockets 314A and 314B, the DC/DC converter 313 converts and uses the voltage.

In the LOP controller 310 to which the power supply module 400 is attached, DC power is supplied through the pins of the socket, which are not used for serial communication, and the wires of the communication cable, to supply the power to the other LOP controller 310 connected via communication. When this method is applied, only a portion of the LOP controllers 310 may be supplied with power from the motor control center. For example, as illustrated in FIG. 9(*a*), power may be supplied only to the LOP controller 310 closest to the motor control center.

When the power supply module 400 is mounted on only one LOP controller 310 to supply power, there is a risk that all the LOP controllers 410 will not work due to disconnection of the power supply line or failure of the power supply module 400.

As shown in FIG. 9(*b*), when the power supply module 400 is mounted on two or more LOP controllers 310 respectively, redundancy and fault tolerance of the power supply become possible.

When the multiple power supply modules 400 are located in the vicinity of the multiple LOP controllers 310 and generate DC power from the input power supply, the multiple power supply modules 400 applies DC power in parallel to at least two different points for some wires in the communication cable that constitutes the serial communication network between the integrated module 100 and the LOP controller 310. All or a portion of the power supply module 400 is attachable and detachable to and from the LOP controller 310 (a portion of the power supply module may be included and configured in the LOP relay device as described later).

When the power supply module 400 is installed in each of two or more LOP controllers 310, the power supply is redundant. Therefore, there are advantages that power may be normally supplied to all the LOP controllers 310 even if some power supply modules 400 fail or some power supply lines from the motor control center are disconnected, and power may be supplied to all the LOP controllers 310 even if the communication cable for serial communication is disconnected or unplugged at one point.

Figure 4:
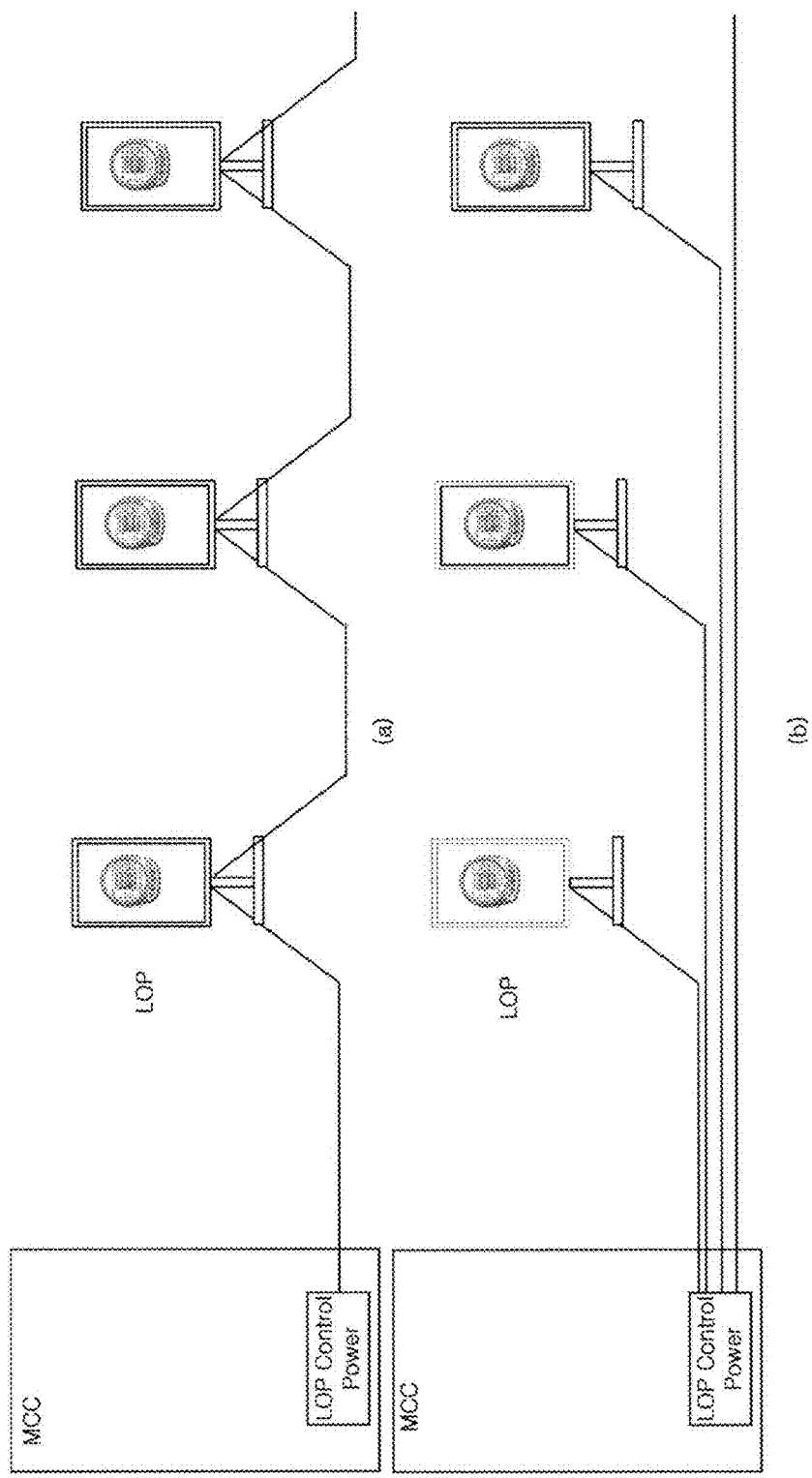
FIG. 4(*a*) is a view showing that power is supplied from the motor control center to each LOP using a single power line, and FIG. 4(*b*) is a view showing that power is supplied from the motor control center to each LOP using a separate power line.

Assuming that the power supply is provided as shown in FIG. 4(*a*), when the power supply line is disconnected at one point, there is a problem that power cannot be supplied to the LOPs at the latter part of the disconnection. There is no such problem when power is supplied to each LOP as shown in FIG. 5(*b*), but there are problems that the number of the power lines is very large and the redundancy cannot be achieved. According to an aspect of the present invention, there is an advantage that the fault tolerance for the power source is increased while such problems are reduced remarkably.

When it is necessary to increase the capacity of the power supply module due to reduction in the power supply voltage caused by the length of the long power line or a large number of the LOP controllers 310, the number of the LOP controllers 310 to which the power supply modules 400 are installed may be increased, thereby easily coping with reduction of the power supply voltage and increase of the capacity.

Figure 10:
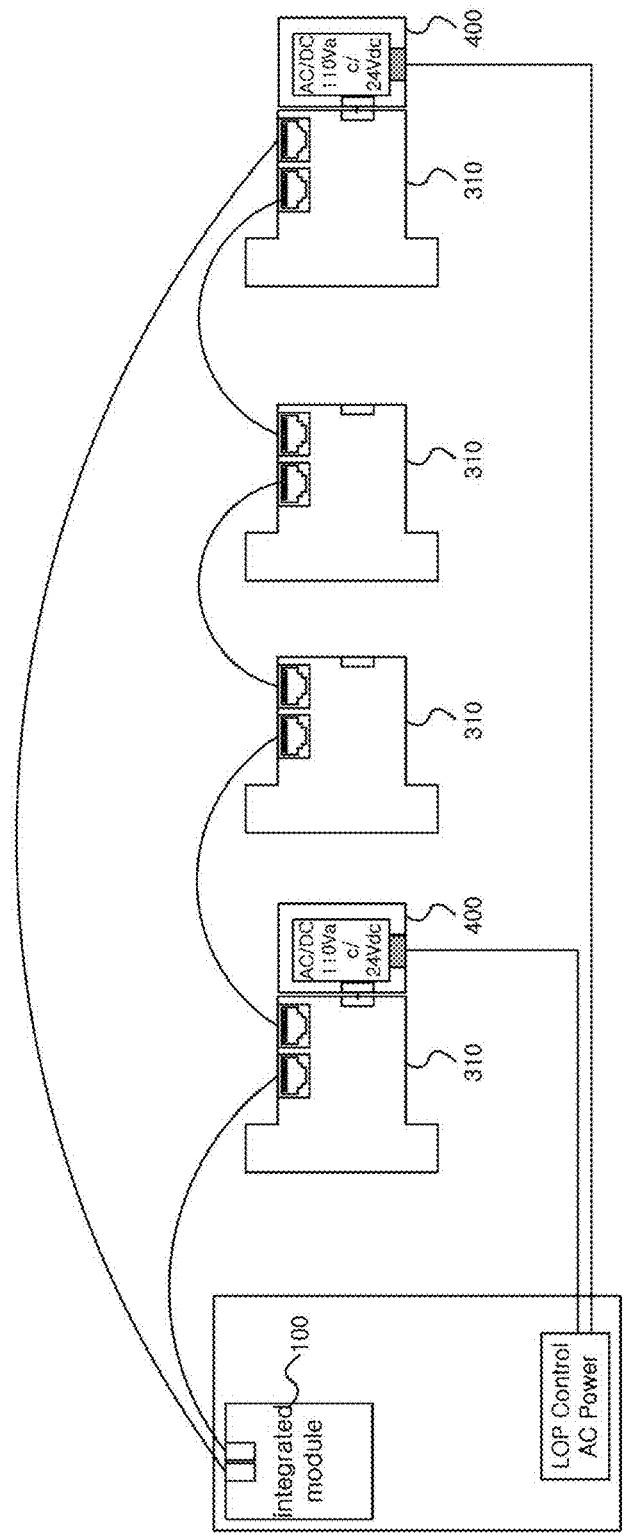
FIG. 10 is a diagram showing an integrated module 100 and a LOP controller 310 in a motor control center system according to an embodiment of the present invention.

FIG. 10 is a diagram showing an integrated module 100 and a LOP controller 310 in a motor control system according to an embodiment of the present invention.

In the integrated module 100, two communication ports capable of performing serial communication with the LOP controller 310 are provided. A RJ45 socket of the last LOP controller 310 may be connected with the remaining communication ports of the integrated module 100 to form the serial communication line as a ring.

Unlike Ethernet communication, in the case of the master/slave type serial communication, the master device cannot simultaneously communicate with two communication ports. In the initial setting step, the integrated module 100, which is a master device of serial communication, registers an ID of a slave device. When the integrated module 100 performs serial communication through any one port and receives no response from the LOP controller 310 of the registered ID, the integrated module 100 tries to communicate with the LOP controller of the corresponding ID through other communication port at a distance of time.

The integrated module 100 determines whether an abnormality has occurred in the corresponding LOP controller 310 or whether the communication line is unplugged or disconnected. There will be a response to a communication attempt through other communication port when the communication line is unplugged or disconnected at one point, whereas there will be no response when there is a failure of the LOP controller 300, whereby it is possible to distinguish between these two cases.

When the communication line is unplugged or disconnected, with the disconnected point on the border, the integrated module 100 uses all of the two communication ports, with a portion of the multiple LOP controllers 310 performing communication through the first communication port and the remaining LOP controllers 310 performing communication through the second communication port. In addition, the integrated module 100 may distinguish the case where the communication line is unplugged or disconnected from the case where the LOP controller 310 is broken to report to the computer of a main control room or the like, thereby enabling immediate maintenance.

The multiple LOP controllers 310 and the integrated module 100 are connected via serial communication cables so as to form a ring. The integrated module 100 includes a pair of two communication ports, both ends of a chain in which multiple LOP controllers 310 are connected in series is connected to each of the pair of communication ports.

According to the related art, when the serial communication line is disconnected, it is impossible to perform communication with the LOP controllers 310 that are at a stage subsequent to the disconnecting point. However, according to an embodiment of the present invention, since the integrated module 100 is provided with the pair of two communication ports to form the ring, it is possible to quickly check the abnormality of the device or the disconnection of the communication line, thereby maintaining the communication function for all the LOP controllers even if the communication lines is disconnected at one point.

The motors that are controlled through the motor control center may be distributed and installed in various places, and accordingly, the installed LOPs may be dispersed widely. In this case, the distance between the LOPs is so long that the communication line becomes too long or a route of the communication line may become complicated. In order to cope with such a problem, it is necessary to provide means for providing a separate communication line for each direction.

For example, when the motors are distributed in both directions based on the motor control center, since a communication line from the last LOP in one direction to the LOP in the other direction is further required to form the communication line as a ring structure, the configuration of the communication line becomes very inefficient.

One way to solve this problem is to have multiple pairs of communication ports for the LOP controller 310 in the integrated module 100, but there is a difficulty in the situation where many communication ports have been already provided for communication with the protection control module 200 and the main control room.

Figure 11:
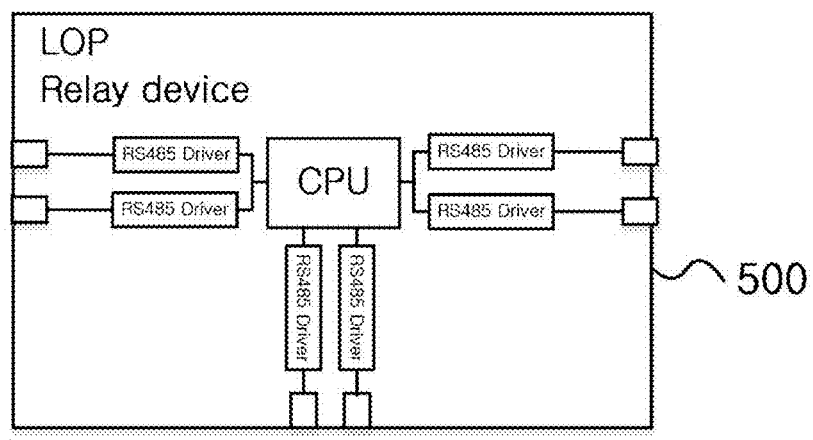
FIG. 11 is a block diagram showing an LOP relay device according to an embodiment of the present invention.
Figure 12:
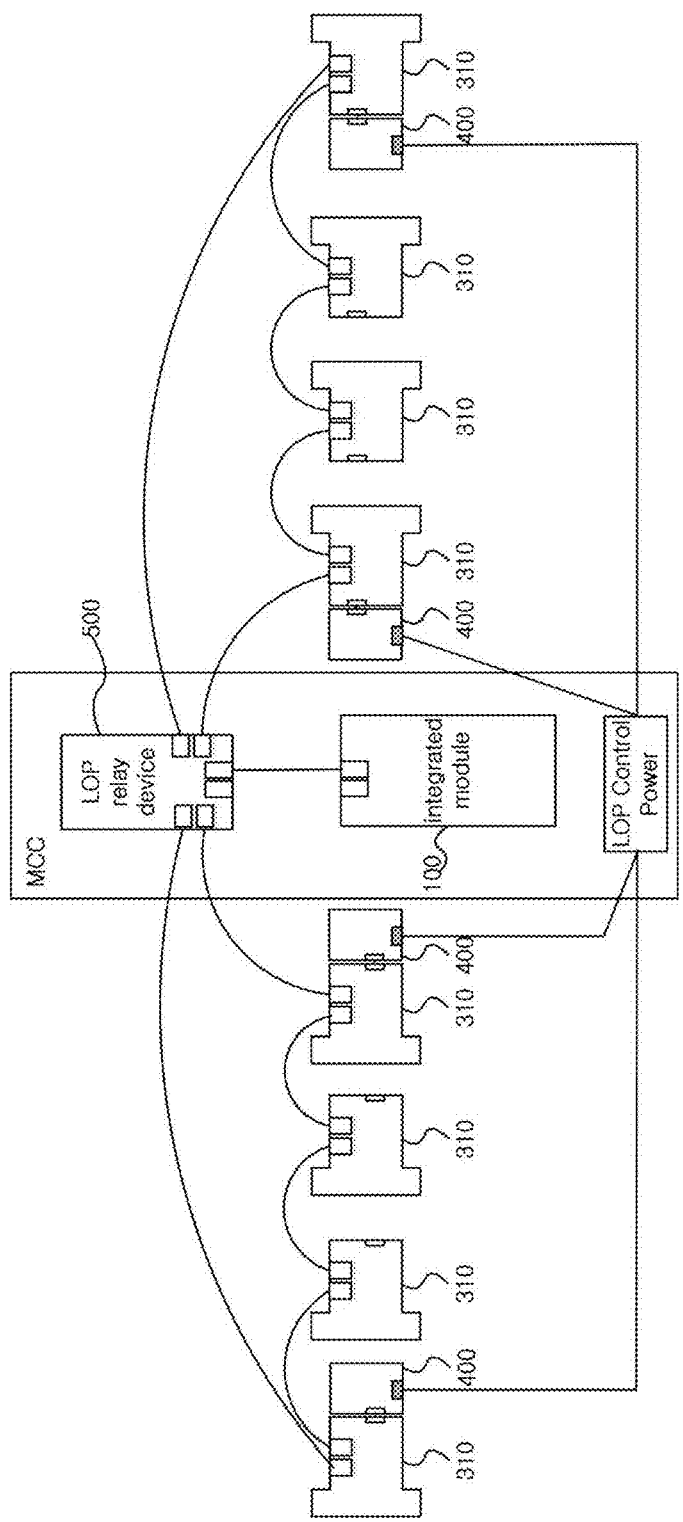
FIG. 12 is a diagram showing a configuration of a motor control center system to which an LOP relay device is applied according to an embodiment of the present invention.

FIG. 11 is a block diagram showing an LOP relay device according to an embodiment of the present invention, and FIG. 12 is a diagram showing a configuration of a motor control center system to which an LOP relay device is applied according to an embodiment of the present invention.

The LOP relay device 500 performs a function of relaying serial communication between the multiple LOP controllers 310 and the integrated module 100. The LOP relay device 500 includes multiple pairs of serial communication drivers such as RS-485, and a CPU for internal control and data storage. For example, the LOP relay device 500 includes two serial communication ports for communication with the integrated module 100 and four serial communication ports capable of communicating with the LOP controller 310 to make two serial communication paths which are redundant with the LOP controllers 310.

As shown in FIG. 12, it is possible to constitute a serial communication network while forming a ring structure for a group of LOP controllers that are arranged to be divided in two directions using the LOP relay device 500.

The LOP relay device 500 has at least one pair of two serial communication ports, and both ends of a chain in which a plurality of LOP controllers 310 are connected in series are respectively coupled to two communication ports. When there is no response to the serial communication through any one port of the pair of two communication ports, the LOP relay device 500 performs serial communication through the other communication port.

The integrated module 100 functions as a master of serial communication for the connected LOP relay device 500, in which the LOP relay device 500 functions as a slave. The LOP relay device 500 functions as a master of serial communication for a plurality of connected LOP controllers 310, in which the LOP controllers 310 function as slaves.

The LOP relay device 500 includes an LOP allocation table in which information on the communication ports allocated for each LOP controller 310 is stored, in which the LOP allocation table may be stored in a nonvolatile memory of the CPU. The LOP relay device 500 may store the ID of the communication port allocated in correspondence with the ID of each of the LOP controllers 310 at the initial setting in an LOP allocation table. The information of the LOP allocation table may be updated, and the communication ports stored in correspondence with the IDs of the LOP controllers 310 that are at a stage subsequent to the disconnecting point may be changed, especially when the communication line is disconnected.

For example, when the LOP relay device 500 receives data from the integrated module 100 to the LOP controller 310 having the specific ID, a communication port allocated from the LOP allocation table is determined and data is transmitted to the corresponding LOP controller 310 through the determined communication port.

Upon using the LOP relay device 500, when the number of the LOPs 300 is very large, or when the LOP relay device 500 are to be distributed in various directions, the number of the LOP relay devices 500 may be increased, thereby making easy extension.

Figure 13:
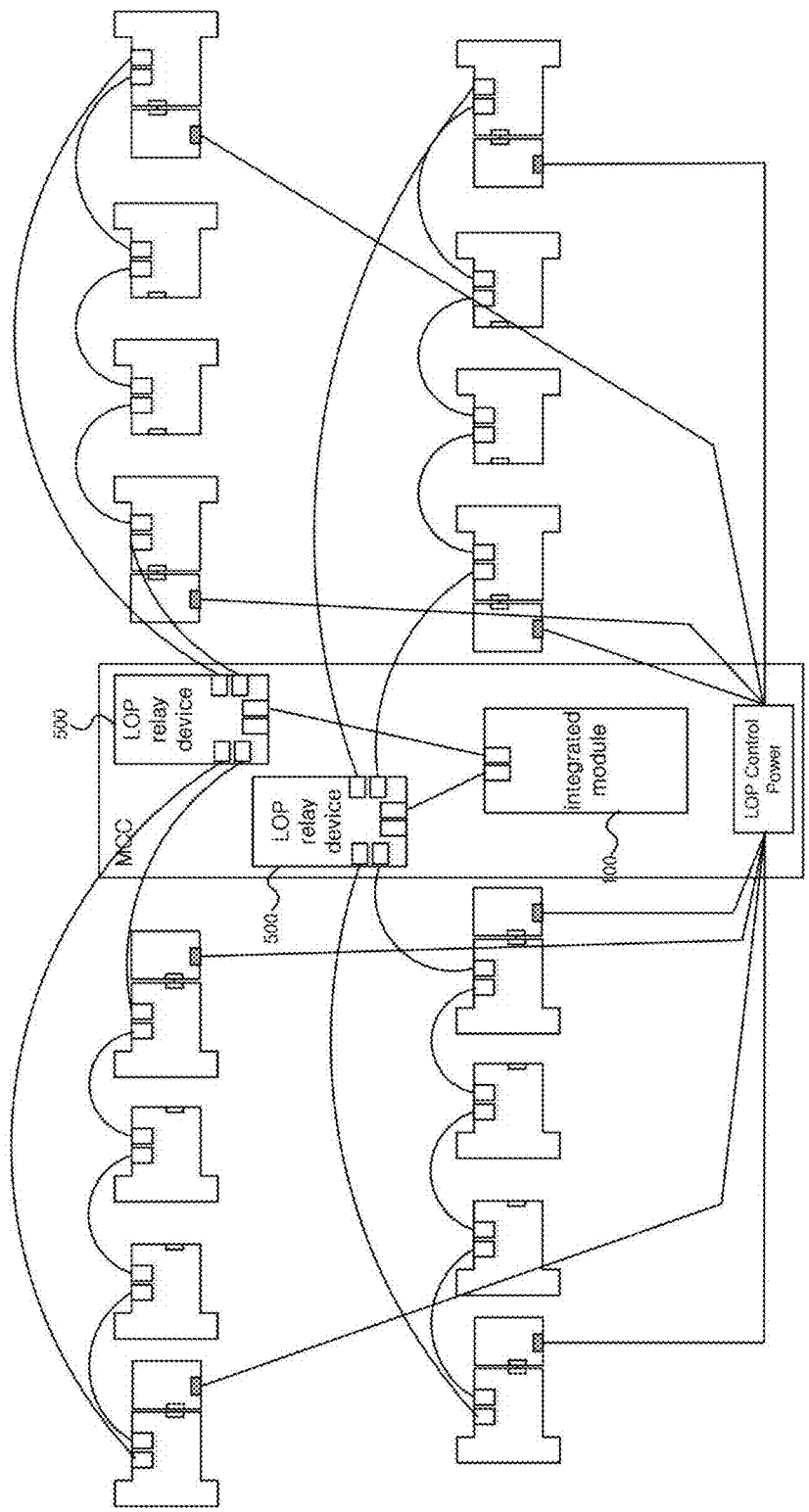
FIG. 13 is a diagram showing a motor control center system of other embodiment using an LOP relay device.
Figure 14:
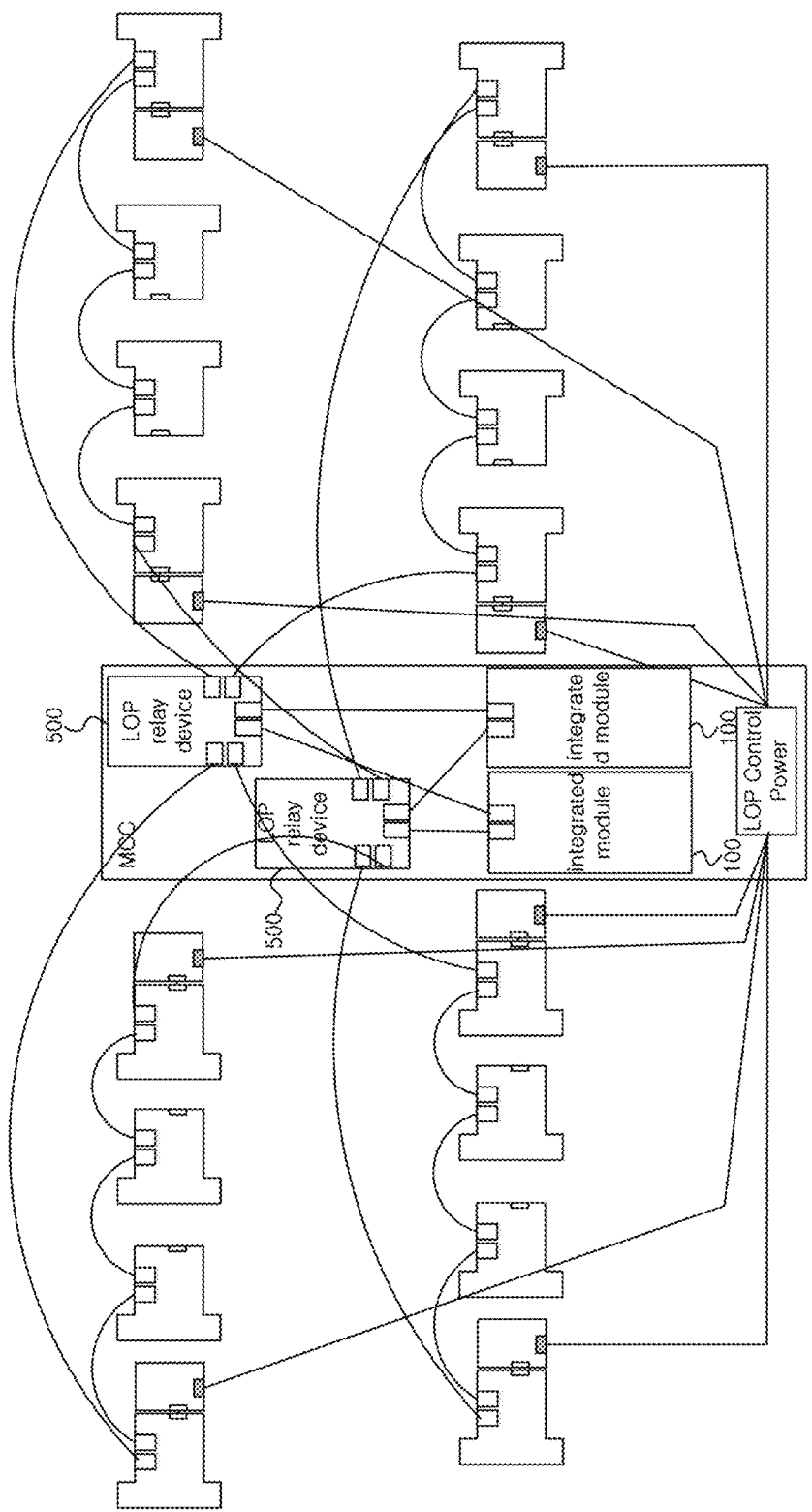
FIG. 14 is a diagram showing a motor control center system of still other embodiment using an LOP relay device.

FIG. 13 is a diagram showing a motor control center system of other embodiment using an LOP relay device, and FIG. 14 is a diagram showing a motor control center system of still other embodiment using an LOP relay device.

The examples of FIGS. 12 and 13 consider redundancy of power and communication of the LOP controller 310, and FIG. 14 considers even redundancy of the LOP relay device 500 and the integrated module 100.

The integrated module 100 includes a master integrated module and a slave integrated module, which constitute a pair, in which the master integrated module operates for normal communication and the slave integrated module operates when a failure occurs. The master integrated module is connected to each of the two LOP relay devices, and the slave integrated module is also connected to each of the two LOP relay devices. Each of the integrated modules 100 includes an LOP allocation table, which stores information on a communication port to be used for each ID of each LOP controller 310 or information on the LOP relay device 500 to be connected, and such information on the LOP allocation table may be updated.

In the embodiment of FIG. 14, the ring initiated at one LOP relay device 500 ends at another LOP relay device 500. Both ends of a chain including multiple LOP relay devices 500 included in one ring are connected to different LOP relay devices 500, respectively. Therefore, even if one LOP relay device 500 fails, it is possible to communicate through the other LOP relay device 500.

Two integrated modules 100 and two LOP relay devices 500 are cross-connected to each other so that even if one of each of the modules and devices fails to perform the function, the other may perform the function. Also, since the LOP controller 310 may communicate with each of two LOP relay devices 500, even if one of two LOP relay devices 500 cannot perform the function, it is possible to communicate with any one of all the LOP controllers 310.

Figure 15:
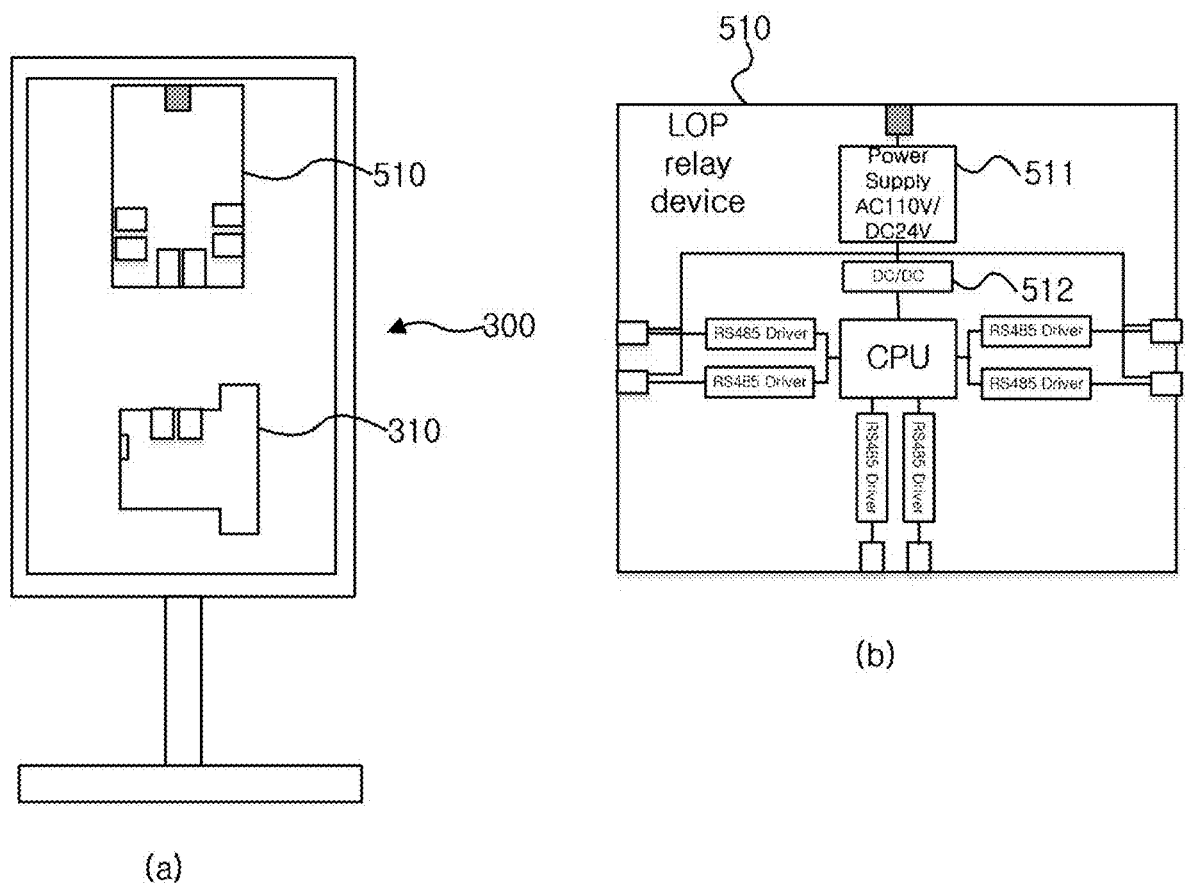
FIG. 15(*a*) is a diagram schematically showing a state in which a LOP controller 310 and a LOP relay device 501 are configured in a LOP 300 according to an embodiment of the present invention, and FIG. 15(*b*) is a block diagram showing a configuration of a LOP relay device 510 according to other embodiment of the present invention.

FIG. 15(a) is a diagram schematically showing a state in which a LOP controller 310 and a LOP controller 310 are configured in a LOP 300 according to an embodiment of the present invention, and FIG. 15(b) is a block diagram showing a configuration of a LOP relay device 510 according to other embodiment of the present invention.

Figure 16:
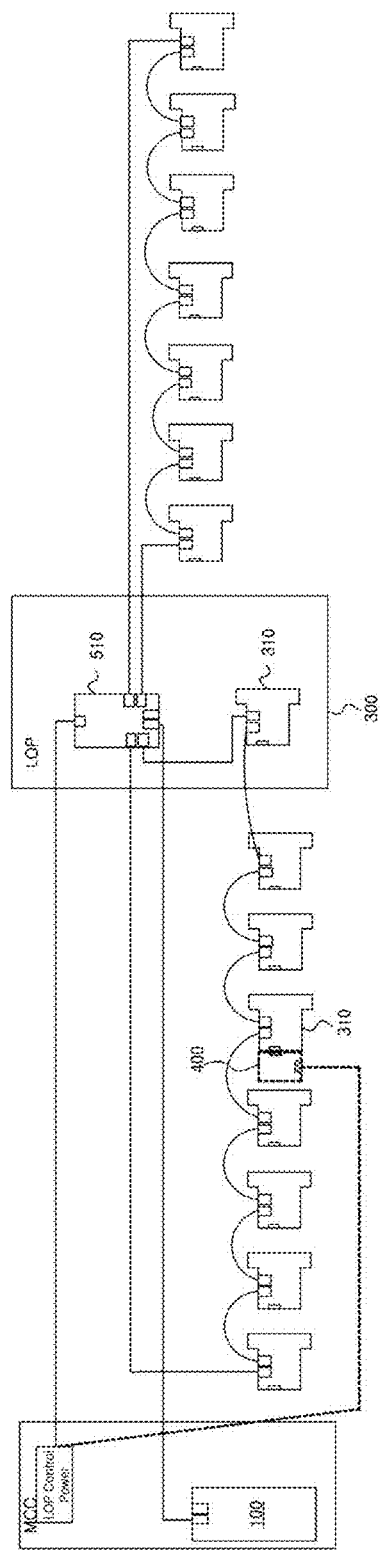
FIG. 16 is a diagram showing a configuration of a motor control center system to which an LOP relay device 510 is applied according to an embodiment of the present invention.
Figure 17:
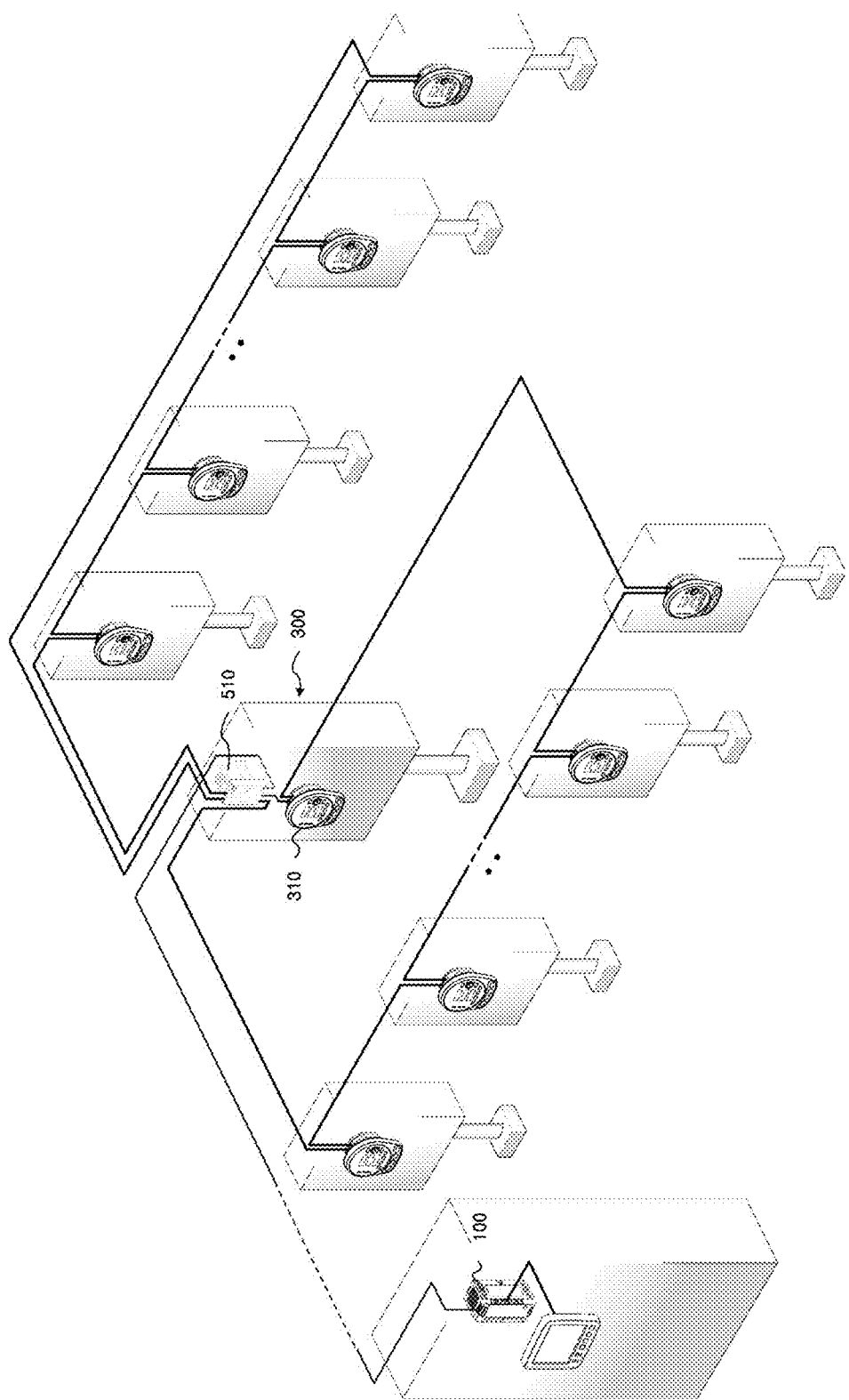
FIG. 17 is a perspective view showing a similar configuration.

FIG. 16 is a diagram showing a configuration of a motor control center system to which an LOP relay device 510 is applied according to an embodiment of the present invention, and FIG. 17 is a perspective view showing a similar configuration (power supply line form the motor control center is omitted).

The LOP relay device 510 according to other embodiment of the present invention includes a power supply module 511 and a DC/DC converter 512.

A more effective configuration becomes possible when the LOP relay device 510 is not installed in the motor control center, but installed in a specific LOP 300 together with the LOP controller 310. The LOP relay device 510 has the capacity of the power supply module 511 designed to have a capacity larger than the capacity to be internally supplied. In the case that the LOP relay device 510 is installed in the motor control center, when the LOP relay device is designed to have a power capacity enough to be consumed by the device itself, the LOP relay device 510 is installed in the LOP 300 in such a manner as to have a power supply function for other LOP controller 310 adjacent to the LOP controller 310 of the corresponding LOP 300 together with power supply function of the LOP relay device itself, shown in FIG. 15.

The power supply module 511 is located in the vicinity of the LOP controller 310 and is configured to be included in the LOP relay device 510 to generate DC power from the input power supply.

The power output from the power supply module 511 is used as a power source of the LOP relay device 510 via the DC/DC converter 512 and is applied to some wires (lines) of the communication cable via each communication port of the LOP relay device 510, that is, some wires not used for communication. Therefore, there is an effect same as the case that the power supply module for the LOP controller 310 is housed in the LOP relay device 510. The power line supplied from the motor control center may be connected to the LOP relay device 510.

In the case that the LOP relay device is inside the motor control center (MCC), when the distance from the MCC to the LOP is long, the relay device cannot supply the control power to the LOP controller by the voltage reduction of the control power source (24 VDC). By providing the relay device in the LOP, the relay device may be positioned to be close to the LOP controllers so that the control power may be supplied from the relay device.

In the case where the capacity provided by only the power supply module 511 housed in the LOP relay device 510 is insufficient, an additional power supply module 400, together with the power supply module 511 housed in the LOP relay device 510, may be mounted on the back surface of the LOP controller 310. Some of the multiple power supply modules are configured inside the LOP relay device 510, and the remaining are mounted outside the LOP controller 310.

According to an embodiment of the present invention, since DC power is applied in parallel to at least two different points for some wires in a communication cable constituting a serial communication network, there are advantages that the number of power supply modules and power lines may be substantially reduced and a normal power supply is possible even if some power supply modules fail or some power supply lines are disconnected.

Figure 18:
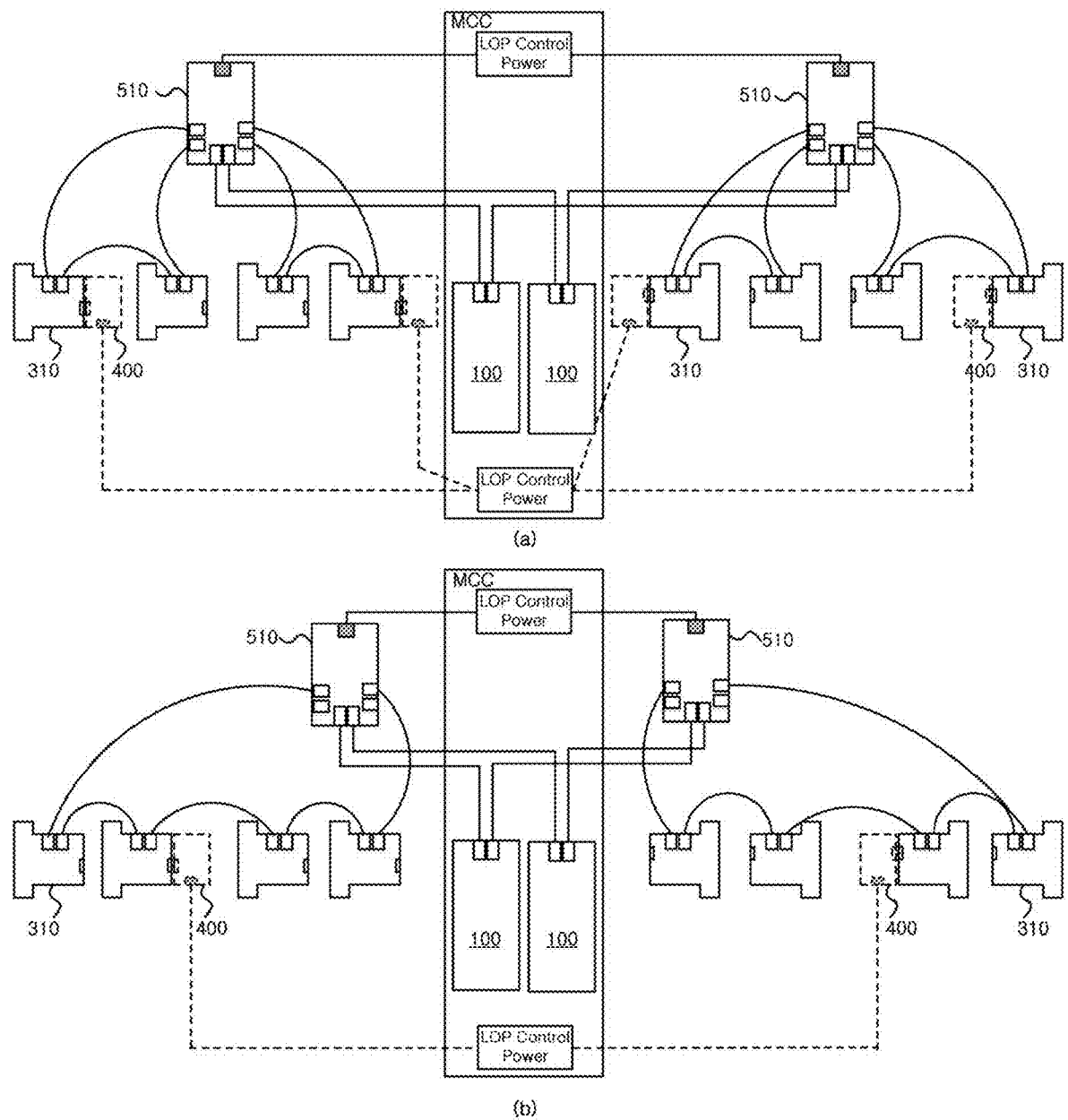
FIG. 18 is a diagram showing a configuration of a motor control center system configured differently by using the LOP relay device 510 according to an embodiment of the present invention.

FIG. 18 is a diagram showing a configuration of a motor control center system configured differently by using the LOP relay device 510 according to an embodiment of the present invention.

FIG. 18 is an example in which communication and power are connected when the LOPs are arranged on both sides of a motor control center. Although the LOP relay device 510 is physically installed in a specific LOP 300 together with the LOP controller 310, the specific LOP 300 is not shown and only the connection line to the devices is shown in order to make it easy understand connection of the power line and the communication line.

Since the LOP relay device 510 supplies the control power of the LOP controller 310 through a communication cable, it is not necessary to provide a power supply module in the LOP controller 310. When the capacity of the power supply module 511 included in one LOP relay device 510 is insufficient due to a large number of LOPs 300 or when redundancy of power supply is required, the power supply module 400 may be additionally attached to the rear surface of the LOP controller 310.

Even if the LOP relay device 510 supplies power to the LOP controller 310, various communication connections and communication redundancy are possible.

Figure 19:
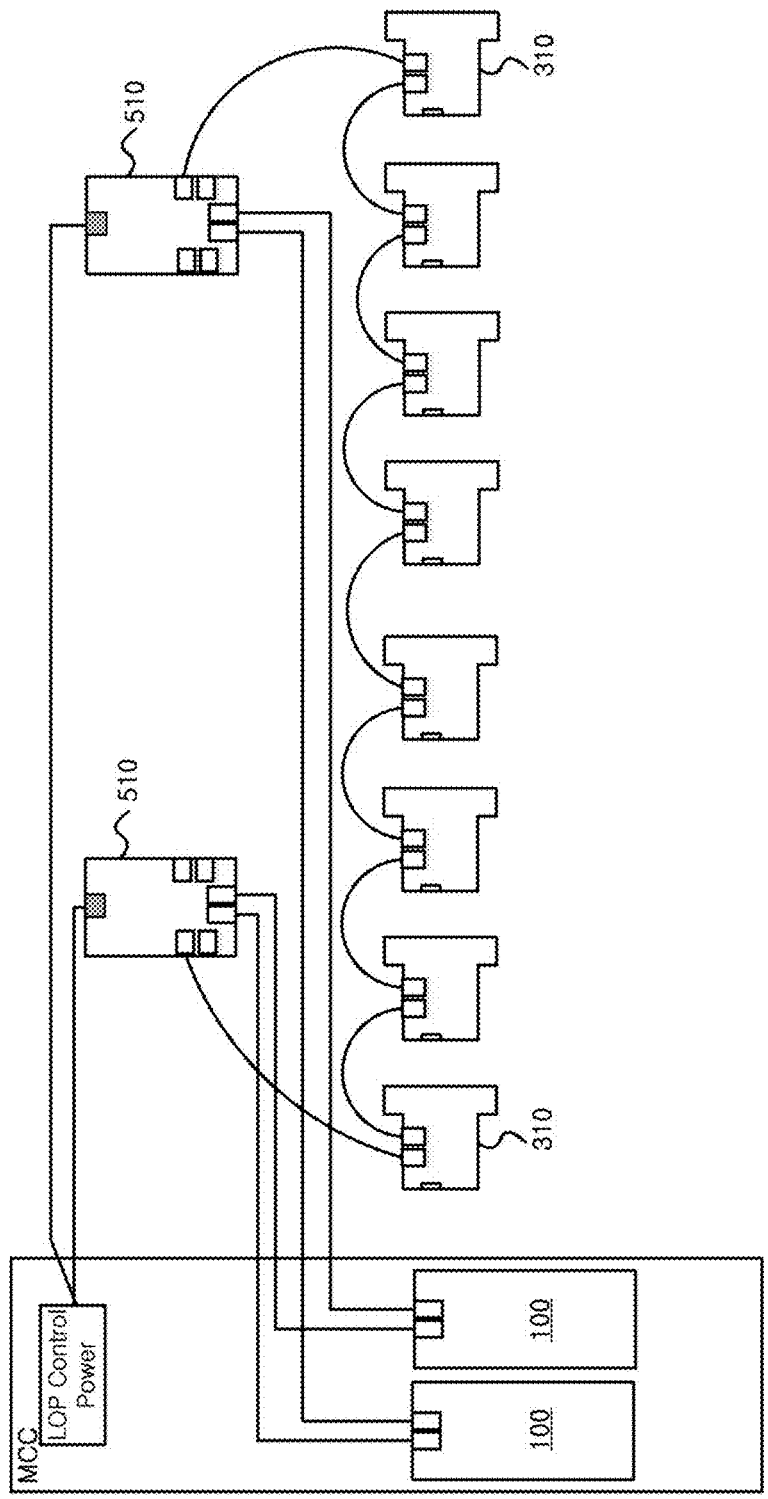
FIG. 19 is a diagram showing a configuration of a motor control center system configured differently using the LOP relay device 510 according to an embodiment of the present invention.

FIG. 19 is a diagram showing a configuration of a motor control center system configured differently using the LOP relay device 510 according to an embodiment of the present invention.

The motor control center system shown in FIG. 19 also provides fault tolerance for the LOP relay device 510.

Since each LOP relay device 510 includes the power supply module 511, DC power is applied in parallel to at least two different points for some wires in the communication cable constituting the serial communication network, and each LOP controller 310 receives DC power in parallel via a communication port.

The integrated module 100 includes a master integrated module and a slave integrated module which constitute a pair, in which, for example, one of two integrated modules 100 shown is a master integrated module and the other is a slave integrated module. The LOP relay device 510 includes a master LOP relay device and a slave LOP relay device which constitute a pair, in which one of two LOP relay devices is a master LOP relay device and the other is a slave LOP relay device. The master integrated module is connected to each of the master LOP relay device and the slave LOP relay device, and the slave integrated module is also connected to each of the master LOP relay device and the slave LOP relay device.

One LOP relay device of the master LOP relay device and the slave LOP relay device is connected to one end of a chain in which multiple LOP controllers are connected in series and the other LOP relay device is connected to the other end of the chain.

For example, when a failure occurs in the master LOP relay device while performing serial communication through the master LOP relay device, it is possible to communicate with all the LOP controllers 310 through the slave LOP relay device. When a communication line is disconnected at a certain point while performing serial communication through the master LOP relay device, communication may be performed through the slave LOP relay device for the LOP controllers that are at a stage subsequent to the disconnecting point. When the communication line is disconnected as described above, the communication is performed through the master LOP relay device for some LOP controllers forming one ring and the communication is performed through the slave LOP relay device for the remaining LOP controllers. In the case of the integrated module 100, it may be inconvenient to collect data from two LOP relay devices when the communication line is disconnected. This inconvenience may be solved by the following configuration of the motor control center system.

Figure 20:
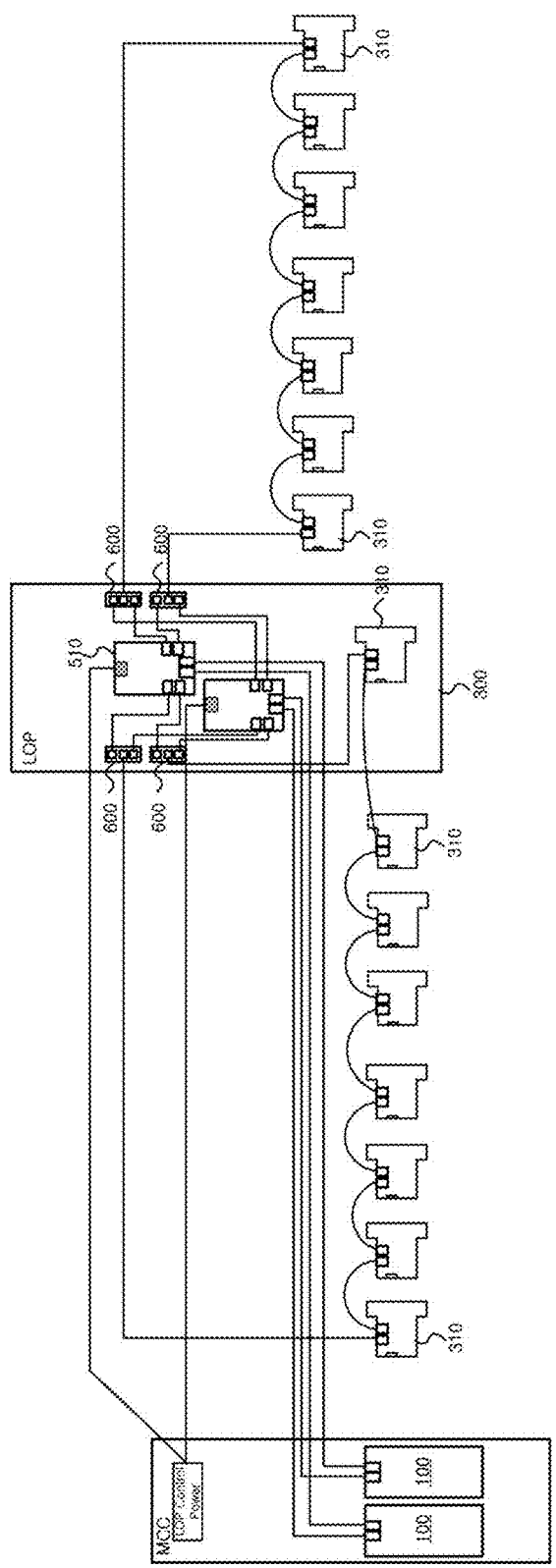
FIG. 20 is a diagram showing other configuration of a motor control center system to which an LOP relay device 510 is applied according to an embodiment of the present invention.
Figure 21:
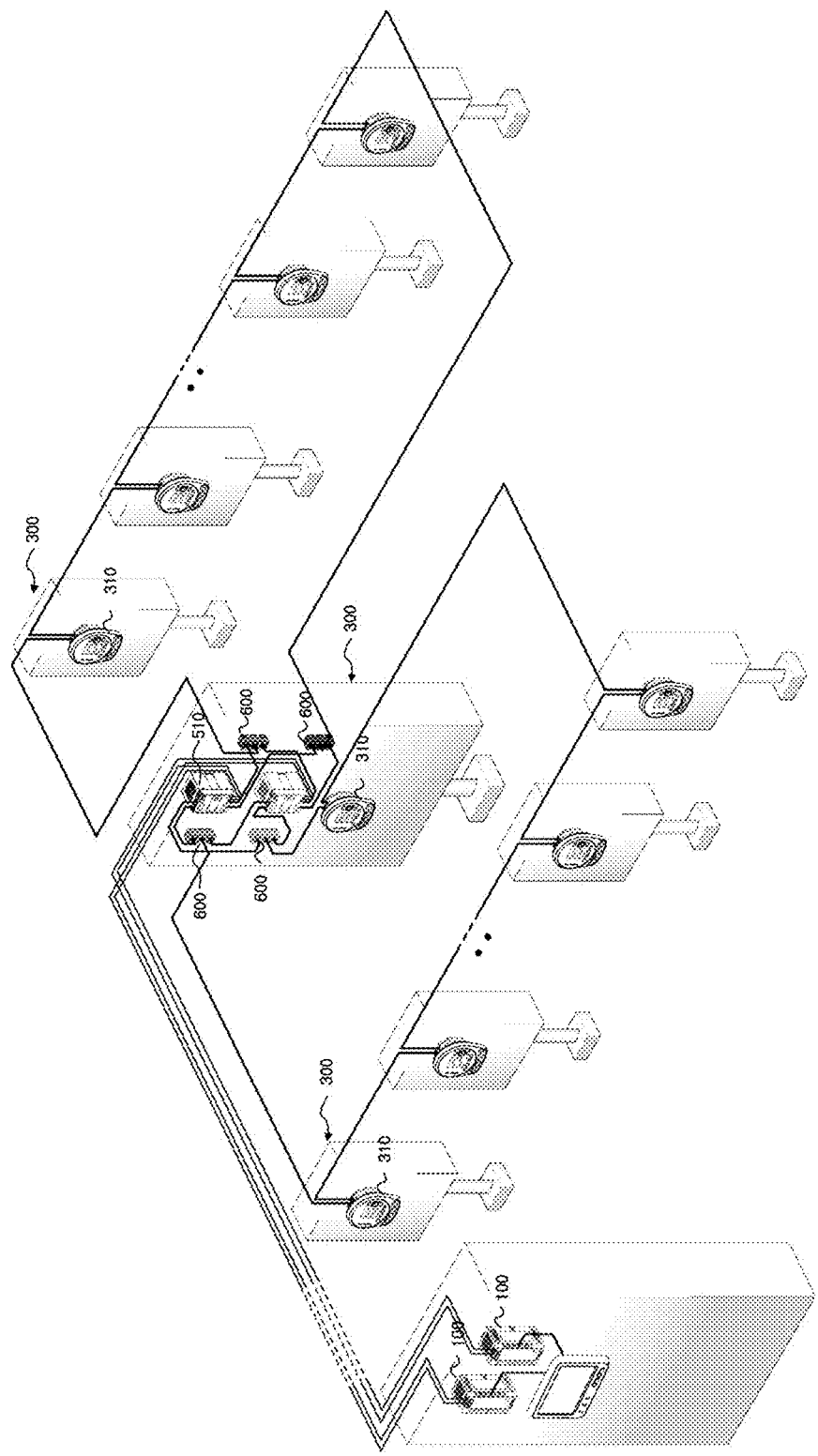
FIG. 21 is a perspective view showing a similar configuration (a power line from a motor control center is omitted)

FIG. 20 is a diagram showing other configuration of a motor control center system to which an LOP relay device 510 is applied according to an embodiment of the present invention, FIG. 21 is a perspective view showing a similar configuration (a power line from a motor control center is omitted), and FIG. 22 is a diagram showing an internal configuration of a socket board 600.

As shown in FIG. 22, the socket board 600 has at least three sockets, and pins of three sockets are commonly connected to each other.

The integrated module 100 constitutes a pair of two integrated modules, one of which is a master integrated module and the other of which is a slave integrated module. Although the integrated module 100 is not shown, the integrated module 100 is connected to the protection control modules in the motor control center through a first serial communication network and connected to the LOP controllers 310 through a second serial communication network.

The LOP relay device 510 is constituted of a pair, one of which is a master LOP relay device and the other is a slave LOP relay device, in which the LOP relay device relays serial communication between multiple LOP controllers and the master integrated module or the slave integrated module. The LOP relay device 510 is provided with a power supply module as described above. Then, DC power is applied in parallel to two different points for some wires in the communication cable constituting the serial communication network. For example, when being viewed from the ring shown on the right side of the drawing, each LOP controller 310 receives DC power in parallel from two LOP relay devices 510 through a socket board 600 and a communication cable.

The master integrated module is connected to each of the master LOP relay device and the slave LOP relay device, and the slave integrated module is also connected to each of the master LOP relay device and the slave LOP relay device.

One end of a chain in which multiple LOP controllers 310 are connected in serial using the socket board 600 is commonly connected to the first communication port of the master LOP relay device 510 and the first communication port of the slave LOP relay device, and the other end of the chain is commonly connected to the second communication port of the master LOP relay device and the second communication port of the slave LOP relay device.

In the motor control center system shown in FIG. 20, one of the master integrated module or the slave integrated module is selectively activated, and in particular, one of the master LOP relay device or the slave LOP relay device is selectively activated, thereby preventing collision of both.

For example, when a failure occurs in the master LOP relay device while performing communication using the master LOP relay device, it is possible to perform all communications using the slave LOP relay device.

Further, when the disconnection occurs at one point of the communication cable, the data must be collected using both the master LOP relay device and the slave LOP relay device in the case of the motor control center system shown in FIG. 19. However, in the case of the motor control center system shown in FIGS. 20 and 21, it is possible to perform the communication using the activated LOP relay device.

According to the motor control center system according to an embodiment of the present invention, it is possible to cope with the failure of the integrated module or the LOP relay device, cope with the disconnection occurring in any communication line and communication port, cope with the abnormality of the power supply line or the power supply module from the motor control center, thereby substantially improving fault tolerance of the system. In addition, the power supply module and the power supply line may installed in only some LOPs or LOP relay devices, without a need of installing the power supply module and the power supply line on all the LOPs, which results in more efficient configuration.

According to the present invention, by configuring the 'integrated module', which controls the motor control center and controls the three-directional communication with the LOP, the protection control module, and the main control room (PLC), it is possible to configure a system with high stability even upon communicating with the LOPs and supplying power.

What is claimed is:

1. A motor control center system comprising multiple protection control modules included for each of basic units constituted by an array in a motor control center to protect or control a motor; and multiple LOP controllers receiving at least operational command for the motor at a local place where the motor is installed, the system further comprising:

an integrated module connected to the multiple protection control modules through a first serial communication network and connected to the multiple LOP controllers through a second serial communication network to communicate with a computer or a PLC in a main control room, wherein i) operation command transmission between the LOP controllers and the protection control modules and ii) measurement data collection, operational state reporting, or control command transmission between the main control room or the PLC and the protection control modules are performed while the integrated module commonly intervenes therebetween and commonly use the first serial communication network.

2. The system of claim 1, wherein the integrated module is installed in an inlet unit including a main line for supplying power to a branch line of the basic unit and a main circuit breaker, and provides voltage data sampled by the main line to the multiple protection control modules to allow the protection control modules to use the voltage data.

3. The system of claim 1, wherein the integrated module functions as a master of serial communication at the first serial communication network, and functions as a master of serial communication at the second serial communication network.

4. A motor control center system comprising multiple protection control modules included for each of basic units constituted by an array in a motor control center to protect or control a motor; and multiple LOP controllers receiving at least operational command for the motor at a local place where the motor is installed, the system further comprising:

an integrated module connected to the multiple protection control modules through a first serial communication network and connected to the multiple LOP controllers through a second serial communication network; and multiple power supply modules located in vicinity of the multiple LOP controllers and generating DC power from an input power supply, wherein the multiple power supply module applies the DC power in parallel to at least two different points for some wires in a communication cable constituting the second serial communication network.

5. The system of claim 4, wherein the LOP controller has at least two sockets to/from which a plug of the communication cable is attached/detached, and all or a portion of the power supply modules each are attachable and detachable to and from the LOP controller.

6. The system of claim 4, wherein the multiple LOP controllers and the integrated module are connected to each other to form a ring, the integrated module has at least two communication ports, and both ends of a chain in which the multiple LOP controllers are connected in series are connected to the two communication ports respectively.

7. The system of claim 4, further comprising an LOP relay device relaying serial communication between the multiple LOP controllers and the integrated module,
in which the multiple LOP controllers and the LOP relay device are connected to each other to form a ring.

8. The system of claim 7, wherein the LOP relay device has at least two communication ports, and both ends of a chain in which the multiple LOP controllers are connected in series are connected to the two communication ports respectively,
in which when there is no response to serial communication through one communication port of the two communication ports, the serial communication is performed through the other communication port.

9. The system of claim 7, wherein the LOP relay device functions as a master of serial communication for the multiple LOP controllers to be connected, and the integrated module functions as a master of serial communication for the LOP relay device to be connected, and
the LOP relay device includes an LOP allocation table in which information on a communication port allocated to each of the multiple LOP controllers is stored.

10. The system of claim 7, wherein the integrated module includes a master integrated module and a slave integrated module which constitutes a pair, and the LOP relay device includes a master LOP relay device and a slave LOP relay device which constitutes a pair,
in which the master integrated module is connected to each of the master LOP relay device and the slave LOP relay device, and the slave integrated module is also connected to each of the master LOP relay device and the slave LOP relay device.

11. The system of claim 10, wherein one LOP relay device of the master LOP relay device and the slave LOP relay device is connected to one end of a chain in which the multiple LOP controllers are connected in series and the other LOP relay device is connected to the other end of the chain.

12. The system of claim 10, wherein one of the master integrated module or the slave integrated module is selectively activated, and one of the master LOP relay device or the slave LOP relay device is selectively activated.

13. The system of claim 12, wherein one end of a chain in which the multiple LOP controllers are connected in series is commonly connected to a first communication port of the master LOP relay device and a first communication port of the slave LOP relay device, the other end of the chain is commonly connected to a second communication port of the master LOP relay device and a second communication port of the slave LOP relay device.

14. The system of claim 13, wherein a socket board having three sockets is used for the common connection.

15. The system of claim 7, wherein the power supply module is configured within the LOP relay device.

16. The system of claim 15, wherein a portion of the multiple power supply modules is configured inside the LOP relay device, and the remaining is mounted outside the LOP controller.

17. A motor control center system comprising multiple protection control modules included for each of basic units constituted by an array in a motor control center to protect or control a motor; and multiple LOP controllers receiving operational command for the motor at a local place where the motor is installed, the system further comprising:
a master integrated module and a slave integrated module connected to the multiple protection control modules through a first serial communication network and connected to the multiple LOP controllers through a second serial communication network; and
a master LOP relay device and a slave LOP relay device relaying serial communication between the multiple LOP controllers and the master integrated module or the slave integrated module,
wherein the master integrated module is connected to each of the master LOP relay device and the slave LOP relay device, and the slave integrated module is also connected to each of the master LOP relay device and the slave LOP relay device, and
one of the master integrated module or the slave integrated module is selectively activated, and one of the master LOP relay device or the slave LOP relay device is selectively activated.

18. The system of claim 17, wherein one end of a chain in which the multiple LOP controllers is connected in series is commonly connected to a first communication port of the master LOP relay device and a first communication port of the slave LOP relay device, and the other end of the chain is commonly connected to a second communication port of the master LOP relay device and a second communication port of the slave LOP relay device.

19. The system of claim 18, wherein a socket board having three sockets is used for the common connection.

* * * * *